(12) United States Patent
Barker et al.

(10) Patent No.: US 9,995,573 B2
(45) Date of Patent: Jun. 12, 2018

(54) PROBE PLACEMENT FOR IMAGE PROCESSING

(71) Applicant: Cognex Corporation, Natick, MA (US)

(72) Inventors: Simon Barker, Sudbury, MA (US); David J. Michael, Wayland, MA (US); William M. Silver, Nobleboro, ME (US)

(73) Assignee: Cognex Corporation, Natick, MA (US)

( * ) Notice: Subject to any disclaimer, the term of this patent is extended or adjusted under 35 U.S.C. 154(b) by 498 days.

(21) Appl. No.: 14/603,969

(22) Filed: Jan. 23, 2015

(65) Prior Publication Data

US 2016/0216107 A1    Jul. 28, 2016

(51) Int. Cl.
| | | |
|---|---|---|
| *G01B 21/00* | (2006.01) | |
| *G06T 7/00* | (2017.01) | |
| *G06K 9/32* | (2006.01) | |
| *G06K 9/62* | (2006.01) | |
| *G06K 9/68* | (2006.01) | |
| *G06T 7/73* | (2017.01) | |

(52) U.S. Cl.
CPC ........... *G01B 21/00* (2013.01); *G06K 9/3241* (2013.01); *G06K 9/6211* (2013.01); *G06K 9/685* (2013.01); *G06T 7/73* (2017.01); *G06T 2207/10004* (2013.01)

(58) Field of Classification Search
CPC .... G01B 21/00; G06K 9/3241; G06K 9/6211; G06K 9/685; G06T 2207/10004; G06T 7/73
USPC ......... 702/150; 345/419; 382/107, 128, 141, 382/199; 600/440
See application file for complete search history.

(56) References Cited

U.S. PATENT DOCUMENTS

| | | | | |
|---|---|---|---|---|
| 6,501,849 | B1 * | 12/2002 | Gupta | ................... G06F 19/321 382/141 |
| 7,016,539 | B1 | 3/2006 | Silver et al. | |
| 8,094,899 | B2 * | 1/2012 | Chouno | ................. A61B 5/055 382/128 |
| 2007/0086658 | A1 | 4/2007 | Kido | |

(Continued)

FOREIGN PATENT DOCUMENTS

EP    1193642 A1    4/2002

OTHER PUBLICATIONS

Behrens, A. and Röllinger, H., "Analysis of Feature Point Distributions for Fast Image Mosaicking Algorithms," Acta Polytechnica Journal of Advanced Engineering, vol. 50, No. 4, pp. 12-18 (2010).

(Continued)

*Primary Examiner* — John H Le
(74) *Attorney, Agent, or Firm* — Wolf, Greenfield & Sacks, P.C.

(57) ABSTRACT

The present application discloses a probe placement module for placing probes on a virtual object depicted in an image. The probe placement module is configured to place probes on interest points of an image so that the probes can accurately represent a pattern depicted in the image. The probe placement module can be configured to place the probes so that the probes can extract balanced information on all degrees of freedom associated with the pattern's movement, which improves the accuracy of the model generated from the probes.

20 Claims, 27 Drawing Sheets

(56) References Cited

U.S. PATENT DOCUMENTS

2010/0259537 A1 10/2010 Ben-Himane et al.
2014/0105506 A1 4/2014 Drost et al.

OTHER PUBLICATIONS

Extended European Search Report issued by the European Patent Office for European Patent Application No. 16152487.1 dated Jun. 24, 2016 (11 pgs.).
Nister, et al., "Visual Odometry for Ground Vehicle Applications," Journal of Field Robotics, vol. 23(1), pp. 3-20 (2006).

* cited by examiner

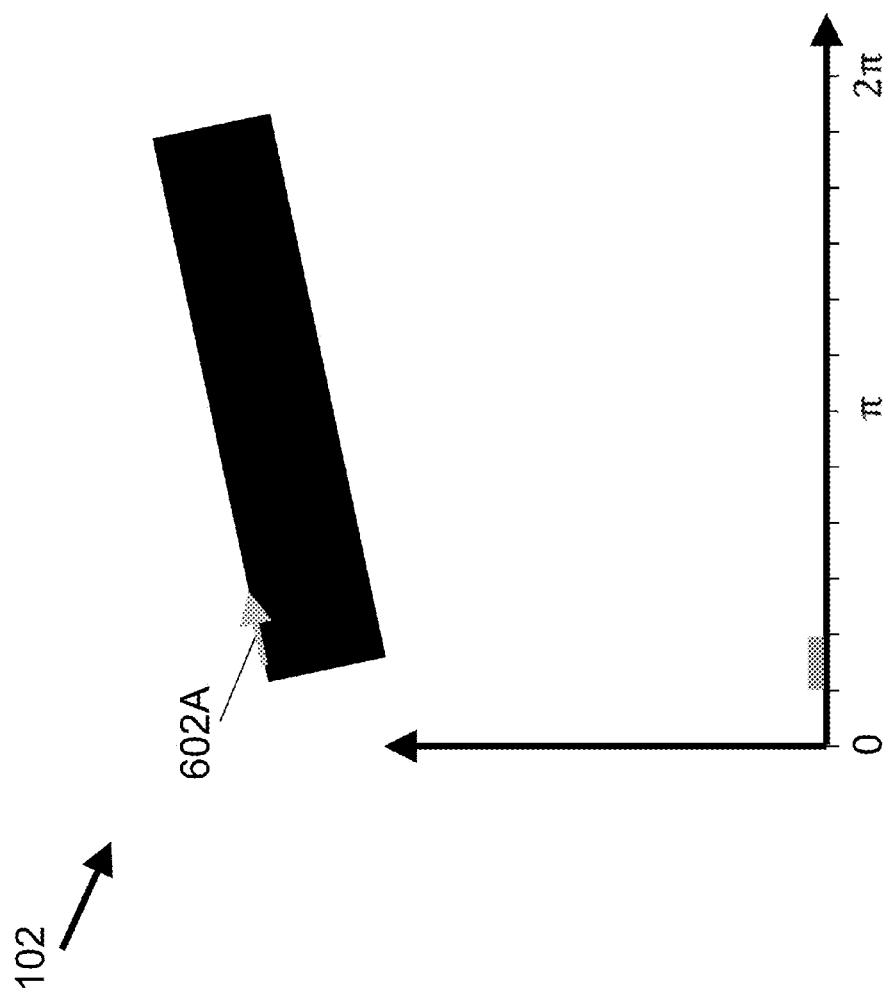

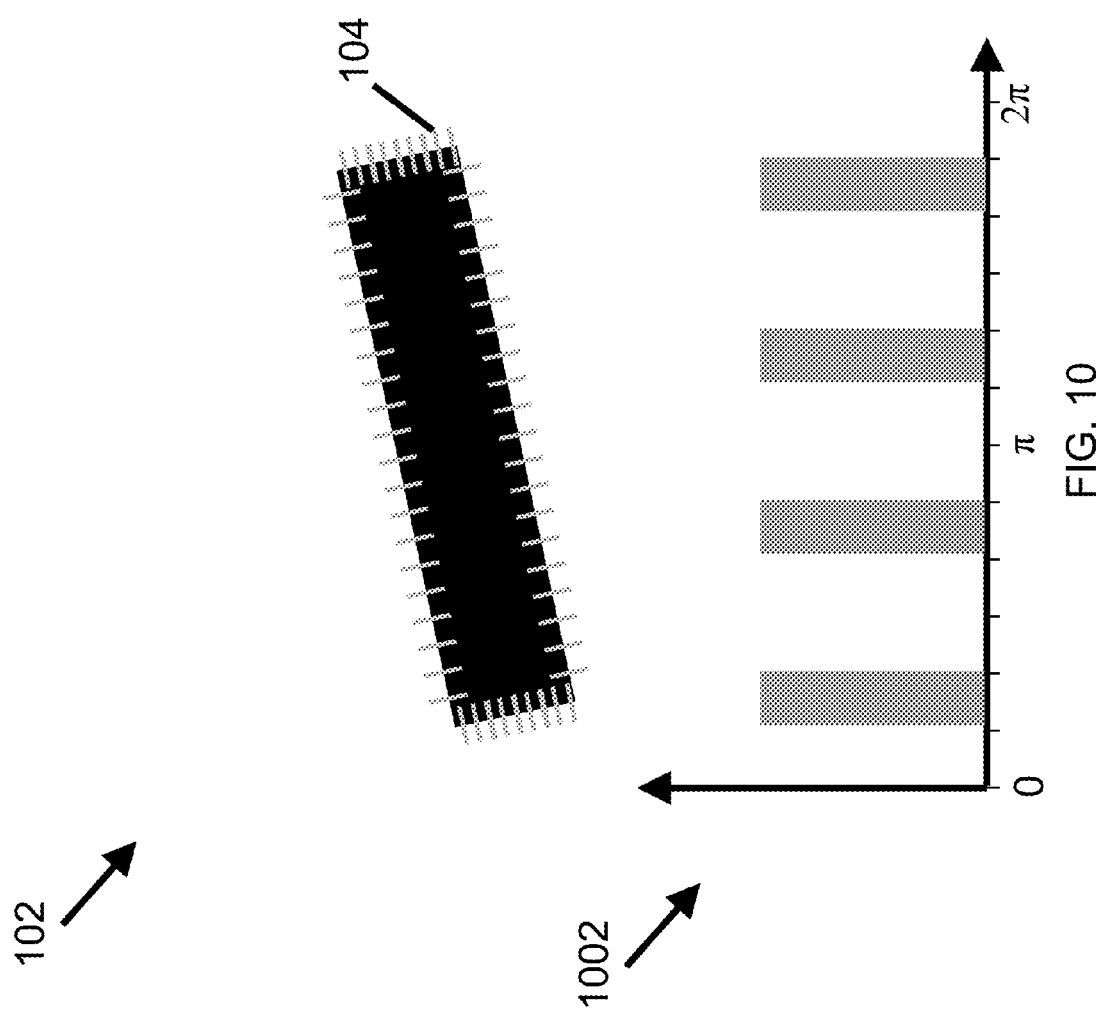

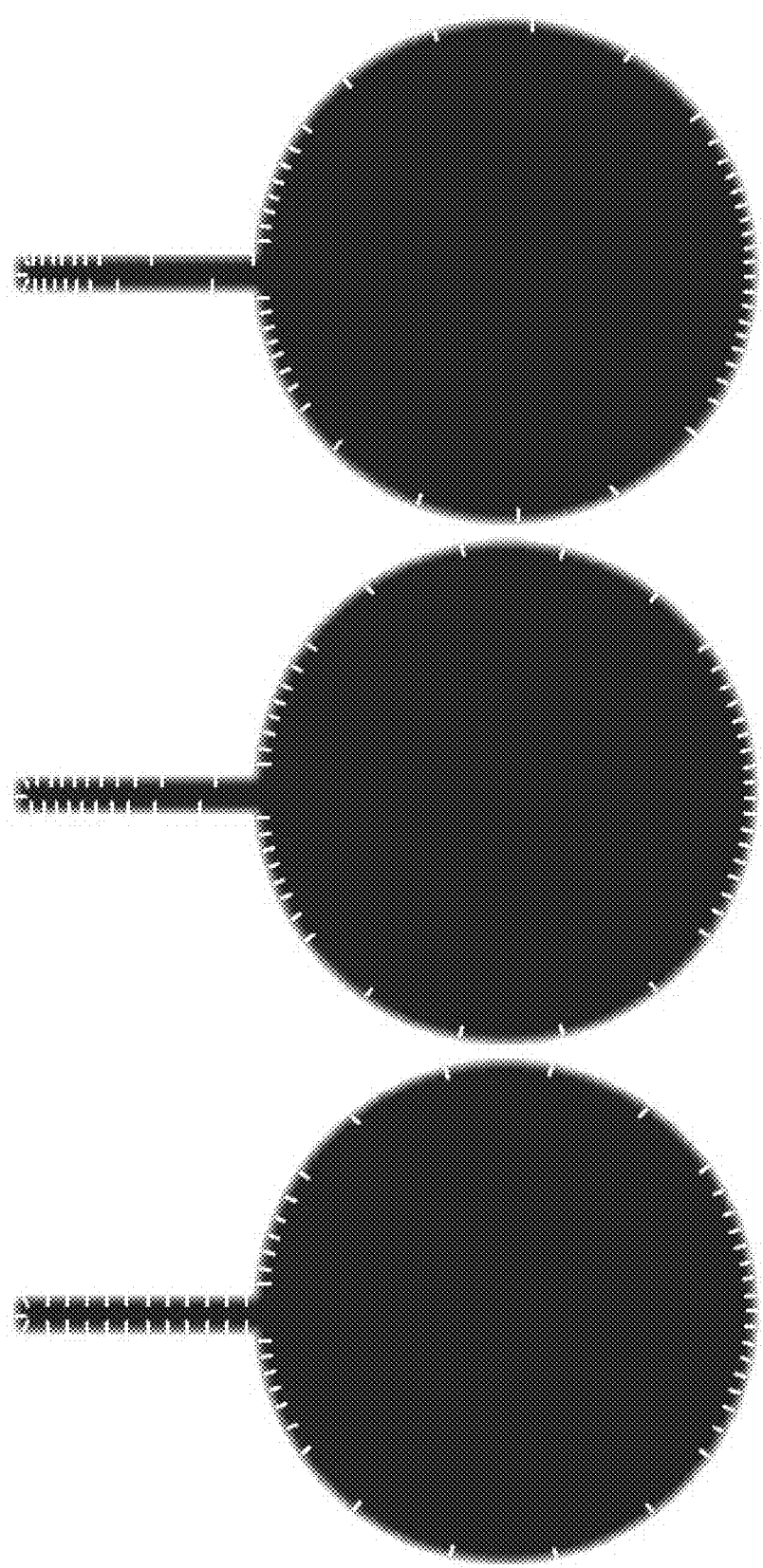

PROBE PLACEMENT FOR IMAGE PROCESSING

TECHNICAL FIELD

Disclosed apparatus, systems, and methods relate to placing probes on an image of a pattern for image processing applications.

BACKGROUND

Digital images are formed by many devices and used for many practical purposes. Devices include cameras with image sensors operating on visible or infrared light, such as a charge-coupled device (CCD) image sensor or a complementary metal-oxide-semiconductor (CMOS) image sensor, line-scan sensors, flying spot scanners, electron microscopes, X-ray devices including computed tomography (CT) scanners, magnetic resonance imagers, and other devices known to those skilled in the art. Practical applications are found in industrial automation, medical diagnosis, satellite imaging for a variety of military, civilian, and scientific purposes, photographic processing, surveillance and traffic monitoring, document processing, and many others.

To serve these applications, the images formed by the various devices are analyzed by machine vision systems to extract appropriate information. One form of analysis that is of considerable practical importance is determining the position, orientation, and size of patterns in an image that correspond to objects in the field of view of the imaging device. Pattern detection methods are of particular importance in industrial automation, where they are used to guide robots and other automation equipment in semiconductor manufacturing, electronics assembly, pharmaceuticals, food processing, consumer goods manufacturing, and many others.

In some cases, pattern detection methods can model patterns using one or more probes. A probe can refer to a position in an image at which the pattern detection methods examine a gradient vector of the image. Therefore, each probe can be associated with a position vector and an orientation vector. Since probes can effectively indicate the position and orientation of a pattern in an image, a machine vision system can use the probes to align the position and orientation of patterns.

SUMMARY

In accordance with the disclosed subject matter, apparatus, systems, and methods are provided for placing probes on a pattern for image processing applications.

Some embodiments include a machine vision system. The machine vision system can include a processor configured to run a computer program stored in memory. The processor can run the computer program to determine, using an interest point detection module, a plurality of interest points from an image, determine, by a feature distribution computation (FDC) module stored in the memory in communication with the interest point detection module, an interest point distribution of the plurality of interest points, determine, using a target distribution computation (TDC) module, a target distribution of a plurality of probes, wherein the target distribution is indicative of a desired placement of the probes on one or more of the interest points, and determine, by a probe distribution match (PDM) module in communication with the TDC module and the FDC module, placements of the plurality of probes on one or more of the interest points based at least in part on the interest point distribution to match a distribution of the plurality of probes to the target distribution.

In some embodiments, the processor can run the computer program to determine orientations at the plurality of interest points, and determine a histogram of the orientations indicative of a number of interest points having a particular orientation.

In some embodiments, the processor can run the computer program to smooth the histogram of the orientations using a smoothing function.

In some embodiments, the processor can run the computer program to determine the plurality of probes that are equally balanced in all considered dimensions.

In some embodiments, the processor is further configured to place a first probe at a first interest point, adjust a length of an arc of the first interest point based on the number of interest points having a substantially similar orientation as the first interest point, and place a second probe at a second interest point based on the adjusted length of the arc of the first interest point.

In some embodiments, the processor is further configured to fit the distribution of the orientations of the plurality of interest points to a probability distribution comprising a mixture model.

In some embodiments, the processor can run the computer program to determine a number of components of the mixture model of the interest point distribution by clustering the plurality of interest points into at least one cluster.

In some embodiments, the processor can run the computer program to adjust the weights of the interest point distribution mixture model to determine the target distribution with a property that at least one of its moments is approximately equal across each of its considered dimensions.

In some embodiments, the processor is further configured to use the target distribution to determine an interest point orientation distribution ratio to re-sample the interest points and produce the plurality of probes.

In some embodiments, the interest point distribution and the target distribution comprise distributions over a predetermined set of dimensions, wherein the predetermined set of dimensions comprises one of Euclidean dimensions or cylindrical dimensions.

Some embodiments include a non-transitory computer readable medium having executable instructions associated with an interest point detection module, a feature distribution computation (FDC), a target distribution computation (TDC) module, and a probe distribution match (PDM) module. These modules are operable to cause a machine vision system to determine a plurality of interest points from an image, determine an interest point distribution of the plurality of interest points, determine a target distribution of a plurality of probes, wherein the target distribution is indicative of a desired placement of the probes on one or more of the interest points, and determine placements of the plurality of probes on one or more of the interest points based at least in part on the interest point distribution to match a distribution of the plurality of probes to the target distribution.

In some embodiments, the non-transitory computer readable medium further comprises executable instructions configured to cause the machine vision system to determine orientations at the plurality of interest points, and determine a histogram of the orientations indicative of a number of interest points having a particular orientation.

In some embodiments, the non-transitory computer readable medium further comprises executable instructions configured to cause the machine vision system to smooth the histogram of the orientations using a smoothing function.

In some embodiments, the non-transitory computer readable medium further comprises executable instructions configured to cause the machine vision system to determine the plurality of probes that are equally balanced in all considered dimensions.

In some embodiments, the non-transitory computer readable medium further comprises executable instructions configured to cause the machine vision system to place a first probe at a first interest point, adjust a length of an arc of the first interest point based on the number of interest points having a substantially similar orientation as the first interest point, and place a second probe at a second interest point based on the adjusted length of the arc of the first interest point.

In some embodiments, the non-transitory computer readable medium further comprises executable instructions configured to cause the machine vision system to fit the plurality of interest points to a mixture of probability distributions, wherein the mixture of probability distributions is indicative of at least a distribution of orientations measured at the plurality of interest points.

In some embodiments, the non-transitory computer readable medium further comprises executable instructions configured to cause the machine vision system to determine a number of probability distributions in the mixture by clustering the plurality of interest points into at least one cluster.

In some embodiments, the non-transitory computer readable medium further comprises executable instructions configured to cause the machine vision system to regularize weights in the mixture of probability distributions.

In some embodiments, the non-transitory computer readable medium further comprises executable instructions configured to cause the machine vision system to compute a ratio of the interest point distribution and the target distribution to determine a distance between adjacent probes.

Some embodiments include a method for operating the disclosed system or the disclosed non-transitory computer readable medium. The method includes determining, using an interest point detection module, a plurality of interest points from an image, determining, using an FDC module stored in the memory in communication with the interest point detection module, an interest point distribution of the plurality of interest points, determining, using a TDC module, a target distribution of a plurality of probes, wherein the target distribution is indicative of a desired placement of the probes on one or more of the interest points, and determining, by a PDM module in communication with the TDC module and the FDC module, placements of the plurality of probes on one or more of the interest points based at least in part on the interest point distribution to match a distribution of the plurality of probes to the target distribution.

In some embodiments, the method includes determining orientations at the plurality of interest points, and determining a histogram of the orientations indicative of a number of interest points having a particular orientation.

In some embodiments, the method includes smoothing the histogram of the orientations using a smoothing function.

In some embodiments, the method includes identifying the plurality of probes that are equally balanced in all considered dimensions.

In some embodiments, the method includes placing a first probe at a first interest point, adjusting a length of an arc of the first interest point based on the number of interest points having a substantially similar orientation as the first interest point, and placing a second probe at a second interest point based on the adjusted length of the arc of the first interest point.

In some embodiments, the method includes fitting the plurality of interest points to a probability distribution comprising a mixture model, wherein the probability distribution is indicative of at least a distribution of orientations measured at the plurality of interest points.

In some embodiments, the method includes determining a number of components of the mixture model of the interest point distribution by clustering the plurality of interest points into at least one cluster.

In some embodiments, the smoothing function comprises a circular kernel in an orientation domain.

In some embodiments, the circular kernel comprises a cosine function.

In some embodiments, the interest points are associated with a boundary of a pattern modeled by the plurality of probes, wherein the interest points are associated with an arc along the boundary.

In some embodiments, the interest points are associated with a boundary of a pattern modeled by the plurality of probes, wherein the interest points are associated with an arc along the boundary.

The disclosed apparatus, systems, and methods described herein can improve a model of a pattern by extracting balanced information in all degrees of freedom for the pattern. For example, when an object corresponding to a pattern is known to move in two dimensions (e.g., translational motion), then the disclosed apparatus and systems can place probes so that the probes can extract balanced information from the pattern in the two dimensions. The disclosed apparatus and systems can be configured to place probes as such using the disclosed methods.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIGS. 6A-6H illustrate a process for generating a histogram of perpendicular orientations in accordance with some embodiments.

FIG. 10 illustrates reverse scaling of scaled arc lengths associated with interest points in accordance with some embodiments.

FIGS. 17A-17C illustrate how the representation of the rotational variable θ changes the probe placement in accordance with some embodiments.

DETAILED DESCRIPTION

Figure 1:
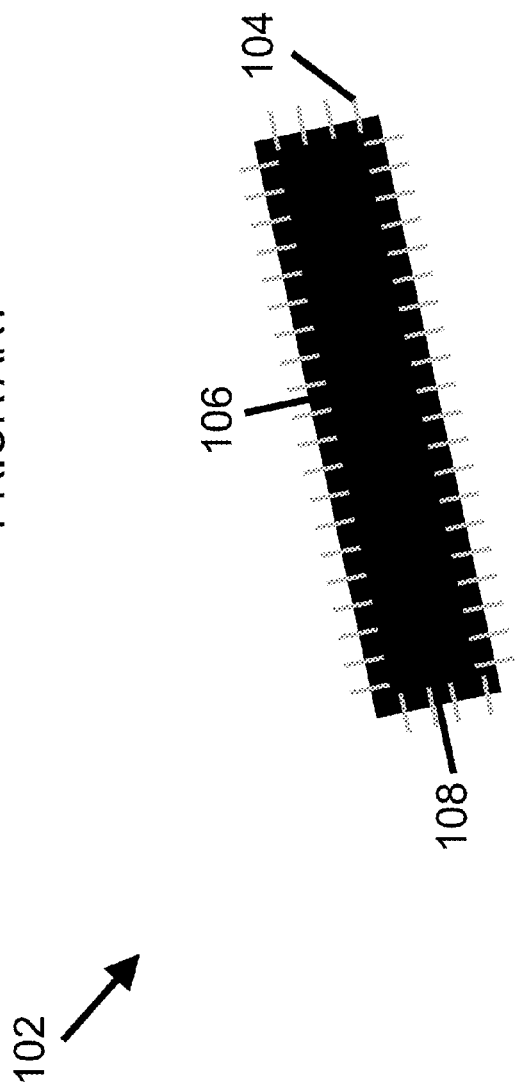
FIG. 1 illustrates a pattern having an elongated rectangular shape and the probes placed uniformly on the pattern.

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems and methods that are within the scope of the disclosed subject matter.

The following introduces exemplary explanations of terms, according to one or more embodiments, that are used throughout the specification. These explanations are not intended to be limiting.

Object—Any physical or simulated object, or portion thereof, having characteristics that can be measured by an image forming device or simulated by a data processing device.

Image—A two-dimensional function whose values correspond to physical characteristics of an object, such as brightness (radiant energy, reflected or otherwise), color, temperature, height above a reference plane, etc., and measured by any image-forming device, or whose values correspond to simulated characteristics of an object, and generated by any data processing device.

Boundary—An imaginary contour, open-ended or closed, straight or curved, smooth or sharp, along which a discontinuity of image brightness occurs at a specified granularity, the direction of said discontinuity being normal to the boundary at each point.

Gradient—A vector at a given point in an image giving the direction and magnitude of greatest change in brightness at a specified granularity at said point.

Pattern—A specific geometric arrangement of contours lying in a bounded subset of the plane of the contours, said contours representing the boundaries of an idealized image of an object to be located and/or inspected.

Model—A set of data encoding characteristics of a pattern to be found for use by a pattern finding method.

Training—A process of creating a model from an image of an example object or from a geometric description of an object or a pattern.

A machine vision system can be configured to determine the absence or presence of one or more instances of a predetermined pattern in an image, and determine the location of each found instance. The process of locating patterns occurs within a multidimensional space that can include, but is not limited to, x-y position (also called translation), orientation, and size.

To determine the absence or presence of one or more instances of a predetermined pattern in an image, a machine vision system can represent the pattern to be found using a model. The machine vision system can generate a model for a pattern from one or more training images or one or more synthesized images from a geometric description that contain examples of the pattern to be located and/or inspected. Once the model is available, the machine vision system can compare the model to a test image at each of an appropriate set of poses, compute a match score at each pose, and determine candidate poses that correspond to a local maximum in match score. The machine vision system can consider candidate poses whose match scores are above a suitable threshold to be instances of the pattern in the image.

A model can include a set of data elements called probes. Each probe represent a relative position at which certain measurements and tests are to be made in an image at a given pose, each such test contributing evidence that the pattern exists at the associated pose. A probe can be placed in a manner substantially perpendicular to a structure (e.g., boundary) of the underlying pattern.

During the training stage, existing machine vision systems place the probes on the boundary of a pattern in a uniform manner. For example, a machine vision system places probes on the pattern boundary so that the distance between adjacent probes is roughly identical for all pairs of adjacent probes. This strategy, which is herein referred to as a "uniform placement strategy," can be effective in modeling patterns with a balanced orientation profile (e.g., a pattern with a boundary that points to a large number of orientations and the proportions of the boundary pointing to various orientations are similar). For example, the uniform placement strategy has been useful in modeling square patterns because the number of probes pointing to different orientations (e.g., up, down, left, and right) is roughly the same on each edge of the pattern in the image, which can lead to accurate information on the location and orientation of the pattern.

Unfortunately, a uniform placement strategy is often ineffective in modeling patterns with an unbalanced orientation profile (e.g., patterns with varying side lengths). For example, the uniform placement strategy is generally not as effective in aligning patterns with an elongated rectangular shape. FIG. 1 illustrates a pattern having an elongated rectangular shape and the probes placed uniformly on the pattern. Because the boundary 102 has an elongated rectangular shape, under the uniform placement strategy, most of the probes 104 would be placed on the long edge 106 of the boundary and only a small number of probes 104 would be placed on the short edge 108 of the boundary. Because the number of probes along the short edge 108 of the boundary is small, it is difficult to determine, based on the probes, whether the short edge 108 exists. Furthermore, even if it is possible to determine that the short edge 108 exists, it is difficult to pin-point to the location of the short edge 108 because the number of probes 104 encoding the location of the short edge 108 is small. This can be problematic, for example, for aligning the boundary 102 horizontally with other patterns.

There has been an effort to vary the distance between adjacent probes to address issues associated with the uniform placement strategy. However, the effort was limited to manual adjustment of probe locations, which can be labor intensive and expensive.

The techniques described herein provide for an automated probe placement module for placing probes on a pattern. The probe placement module is configured to place probes on interest points of an image so that the probes can accurately represent a pattern depicted in the image. The probe placement module can be configured to place the probes so that the probes can extract balanced information on all degrees of freedom associated with the pattern's movement, which improves the accuracy of the model generated from the probes. For example, when an object associated with the pattern is known to move in two dimensions (e.g., translational motion), the probe placement module can place the probes so that the probes can extract balanced information in the two dimensions. The probe placement module can also take into account the shape of the pattern so that the probes can extract balanced information regardless of the shape of the pattern. This is in contrast to techniques that extract unbalanced information, such as extracting more vertical information compared to horizontal information when more probes are placed along the long edge compared to the short edge as shown in FIG. 1.

Figure 2:
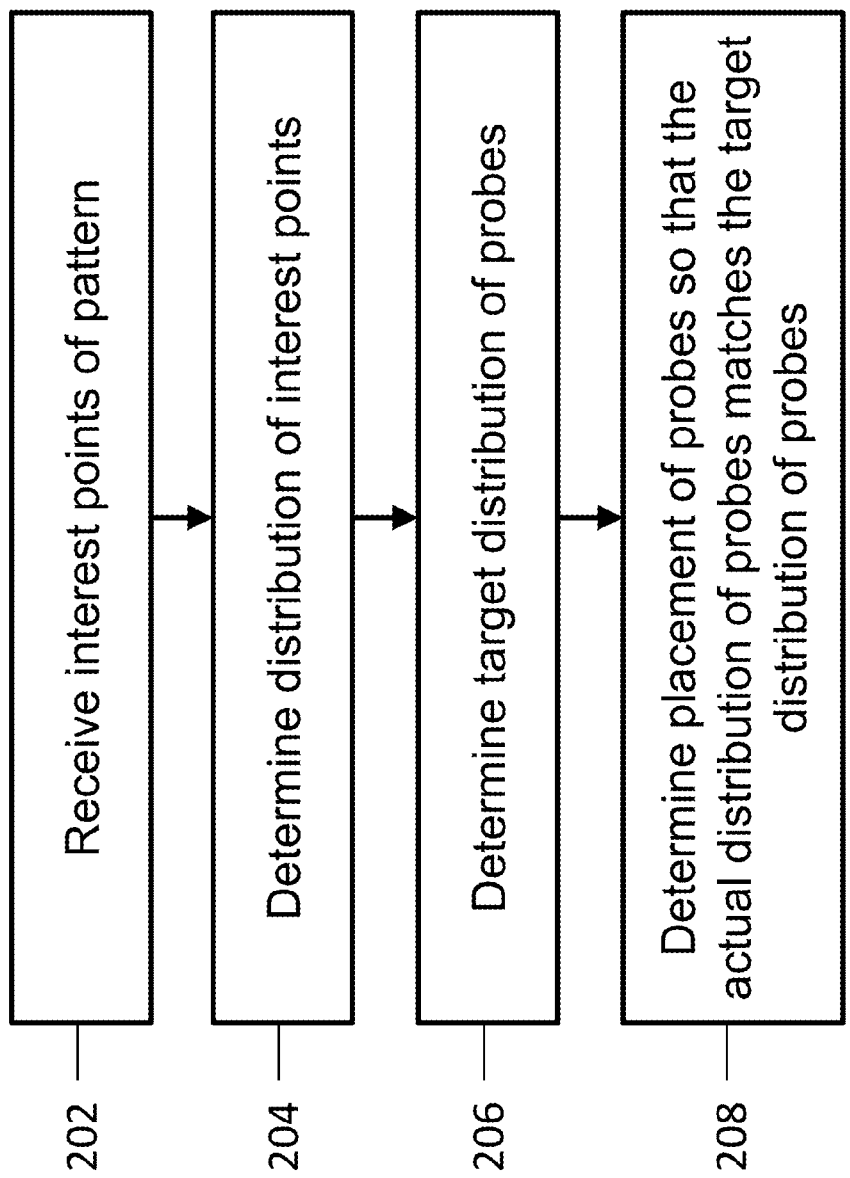
FIG. 2 illustrates a high level process for placing probes on interest points of an image in accordance with some embodiments.

FIG. 2 illustrates a high level process for placing probes on interest points in an image in accordance with some embodiments. Interest points can indicate candidate locations for probes. For example, the probe placement module can be configured to select a subset of interest points in an image and place probes on the selected subset of interest points.

In step 202, the probe placement module can be configured to receive information on the location of interest points in an image. For example, the probe placement module can receive, from an interest point detection module, a boundary of a pattern in an image.

In step 204, the probe placement module can determine the distribution of the interest points. For example, the probe placement module can represent each interest point using a feature (e.g., a perpendicular orientation measured at the interest point) and determine a distribution of features associated with the interest points.

In step 206, the probe placement module can determine the target distribution of probes. In some cases, the target distribution of probes can be determined based on features associated with the interest points and/or the distribution of interest points determined in step 204. For example, the probe placement module can determine that the target distribution of probes is the inverse of the distribution of interest points determined in step 204. In step 208, the probe placement module can determine the location of probes so that the actual distribution of probes matches the target distribution of probes.

The general framework illustrated in FIG. 2 can be implemented using, for example, at least two mechanisms (e.g., either alone and/or in combination with each other). In the first mechanism, the disclosed probe placement module can be configured to place the probes so that the distribution of perpendicular orientations, as measured at probe locations, is balanced (e.g., the histogram of perpendicular orientations at the location of probes is approximately uniform). The first mechanism can be particularly useful for modeling patterns with two degrees of freedom (e.g., a translational movement).

For example, in step 204, the probe placement module can determine the histogram of perpendicular orientations measured at the plurality of interest points in an image. In step 206, the probe placement module can determine that the target distribution of perpendicular orientations, as measured at probe locations, is a uniform distribution. In step 208, the probe placement module can place probes at one or more of the interest points so that the histogram of perpendicular orientations, as measured by the placed probes, is close to the uniform distribution.

Figure 3:
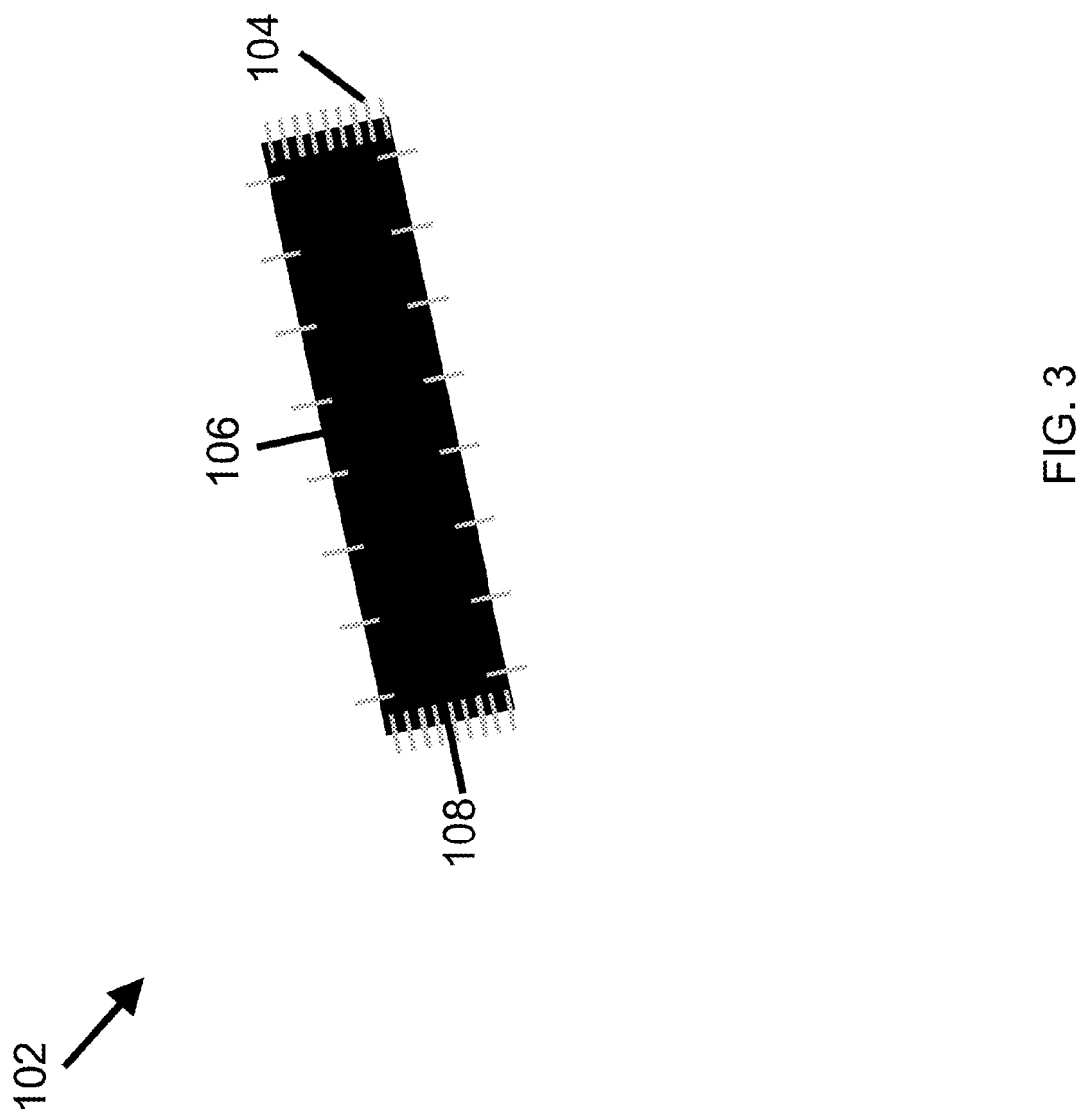
FIG. 3 illustrates a result of placing probes by matching a histogram of perpendicular orientations to a uniform distribution in accordance with some embodiments.

FIG. 3 illustrates a result of placing probes by matching the histogram of perpendicular orientations to a uniform distribution in accordance with some embodiments. In this example, the interest points can collectively form a boundary 102 of a pattern. When the boundary 102 has an elongated rectangular shape, the probe placement module can reduce the number of probes 104 on the long edge 106 and increase the number of probes on the short edge 108 so that the number of probes on the long edge 106 is roughly the same compared to the number of probes on the short edge 108. This way, the orientation distribution of the placed probes 104 can be balanced. The probe placement module implementing the first mechanism is discussed throughout the specification, in particular in regards to FIGS. 5-10.

Under the second mechanism, the probe placement module can determine the location of probes such that the distribution of the probes is substantially similar to the target distribution. In step 204, the probe placement module can represent interest points using variables corresponding to the degree of freedom of the pattern. For example, when an object associated with the pattern is known to move in two-dimensions, the probe placement module can represent an interest point using a two-dimensional gradient vector at the interest point. Then the probe placement module can determine the distribution of interest points by modeling the distribution of perpendicular orientations associated with the interest points.

In step 206, the probe placement module can determine the desired target distribution based on features associated with the interest points. For example, the probe placement module can determine the desired target distribution based on the perpendicular orientations measured at the plurality of interest points. More particularly, the probe placement module can determine the desired target distribution to be an inverse of the distribution of perpendicular orientations measured at the interest points. Similarly, the probe placement module can take into account the rotation vectors and scale information measured at the interest points to determine the target distribution. Subsequently, in step 208, the probe placement module can place the probes on one or more interest points by sampling from the target distribution. The second mechanism is discussed throughout the specification, and in particular in regards to FIGS. 11-18.

Figure 4:
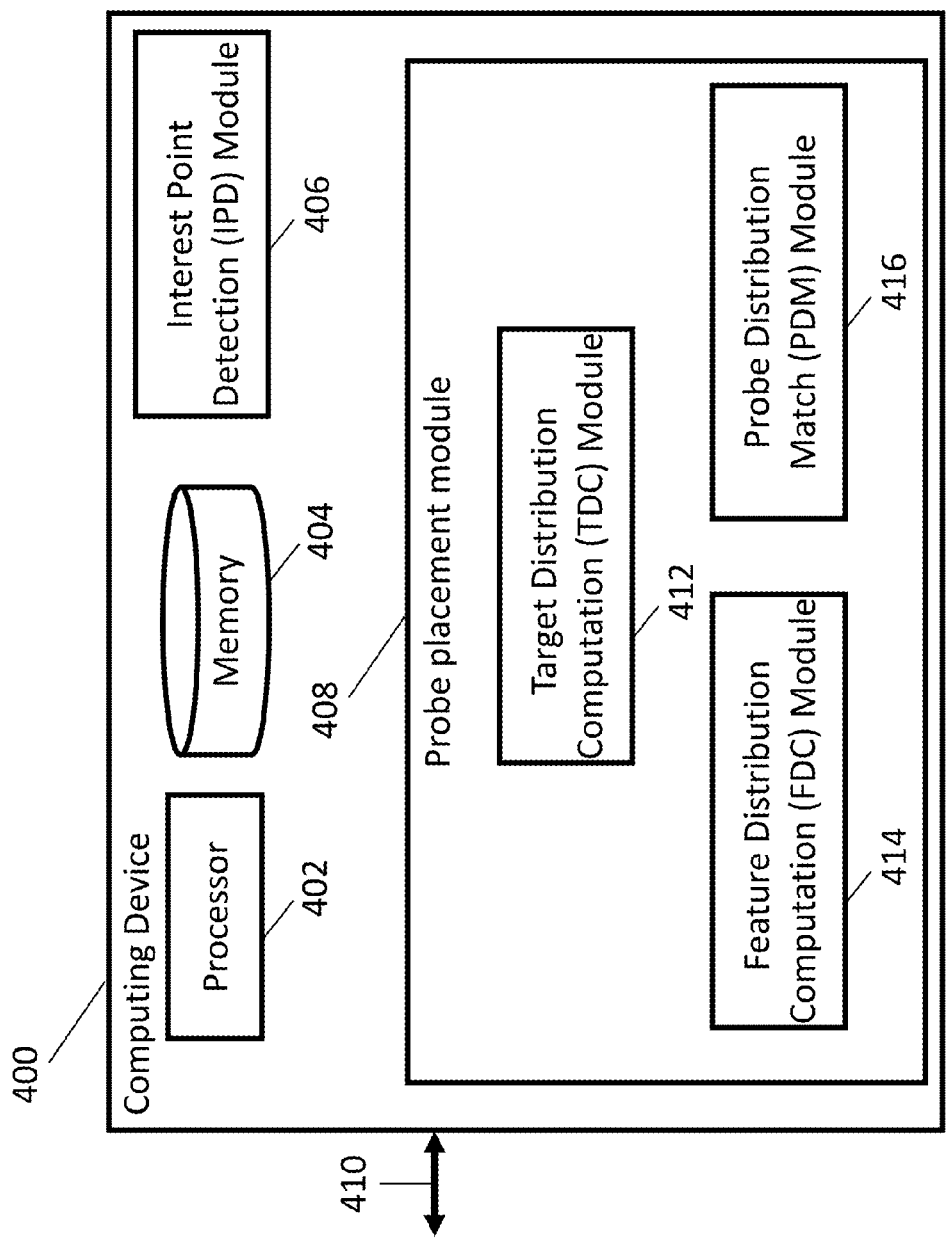
FIG. 4 illustrates a computing device that includes a probe placement module in accordance with some embodiments.

FIG. 4 illustrates a computing device that includes a probe placement module in accordance with some embodiments. The computing device 400 can include a processor 402, memory 404, an interest point detection (IPD) module 406, a probe placement module 408, and an interface 410.

In some embodiments, the processor 402 can execute instructions and one or more memory devices 404 for storing instructions and/or data. The memory device 404 can be a non-transitory computer readable medium, such as a dynamic random access memory (DRAM), a static random access memory (SRAM), flash memory, a magnetic disk drive, an optical drive, a programmable read-only memory (PROM), a read-only memory (ROM), or any other memory or combination of memories. The memory device 404 can be used to temporarily store data. The memory device 404 can also be used for long-term data storage. The processor 402 and the memory device 404 can be supplemented by and/or incorporated into special purpose logic circuitry.

In some embodiments, the IPD module 406 can be configured to detect interest points from an input image. For example, the IPD module 406 can receive, via an interface 410, an image from another device, such as a camera module or another computing device in communication with the IPD module 406. Subsequently, the IPD module 406 can perform image processing operations to detect interest points.

In some embodiments, interest points can include an edge of a pattern, a boundary (e.g., a chain of edges) of a pattern, a texture boundary, a pixel with a large gradient magnitude, a pixel with a large intensity difference from neighboring pixels, a pixel with a large color difference from neighboring pixels, a Scale-Invariant Feature Transform (SIFT) feature point, any pixel that is distinct from neighboring pixels, or any combinations thereof. Therefore, the IPD module 406 can be configured to perform an edge detection operation to determine a set of edges that form a boundary of a pattern, a differentiation operation to detect a pixel with a large gradient magnitude, a SIFT operator to detect SIFT feature points, or any combinations thereof.

In some embodiments, the IPD module 406 can be configured to determine the orientation perpendicular to structures (hereinafter referred to as a perpendicular orientation) underlying the interest points. In some cases, the perpendicular orientation can be determined by determining a gradient orientation of the underlying structure. For example, a gradient vector of the underlying pattern can be determined at the interest point and an orientation associated with the gradient vector can be determined. In other cases, the perpendicular orientation can be determined through simple calculation. For example, two points on a boundary of the structure can be taken and a line that connects the two points can be determined. The orientation perpendicular to the line can be determined to be the perpendicular orientation. In other cases, the perpendicular orientation of a structure can be determined based on information received from other computational modules, for example, a computer aided design (CAD) modeling module.

In some embodiments, the probe placement module 408 can be configured to determine the location of probes based on interest points in an image. The probe placement module 408 can include a target distribution computation (TDC) module 412, a feature distribution computation (FDC) module 414, and a probe distribution match module (PDM) module 416. The TDC module 412 can determine a target distribution of probes to be placed on one or more interest points; the FDC module 414 can determine the distribution of interest points in an image; and the PDM module 416 can determine the location of probes so that the distribution of the probes and the target distribution of the probes are substantially matched. As discussed below, when the TDC module 412 only deals with a histogram of perpendicular orientations, the target distribution can be a uniform distribution. In other embodiments, the probe placement module 408 may include a different set of modules to perform substantially similar operations.

In some embodiments, the interface 410 can be implemented in hardware to send and receive signals in a variety of mediums, such as optical, copper, and wireless, and in a number of different protocols some of which may be non-transient.

In some embodiments, one or more of the modules 406, 408, 412, 414, 416 can be implemented in software using the memory 404. The software can run on a processor 402 capable of executing computer instructions or computer code. The processor 402 is implemented in hardware using an application specific integrated circuit (ASIC), programmable logic array (PLA), digital signal processor (DSP), field programmable gate array (FPGA), or any other integrated circuit. The processor 402 suitable for the execution of a computer program include, by way of example, both general and special purpose microprocessors, digital signal processors, and any one or more processors of any kind of digital computer. Generally, the processor 402 receives instructions and data from a read-only memory or a random access memory or both.

In some embodiments, disclosed method steps can be performed by one or more processors 402 executing a computer program to perform functions of the invention by operating on input data and/or generating output data. One or more of the modules (e.g., modules 406, 408, 412, 414, 416) can be implemented in hardware using an ASIC (application-specific integrated circuit), PLA (programmable logic array), DSP (digital signal processor), FPGA (field programmable gate array), or other integrated circuit. In some embodiments, two or more modules 406, 408, 412, 414, 416 can be implemented on the same integrated circuit, such as ASIC, PLA, DSP, or FPGA, thereby forming a system on chip. Subroutines can refer to portions of the computer program and/or the processor/special circuitry that implement one or more functions.

The modules 406, 408, 412, 414, 416 can be implemented in digital electronic circuitry, or in computer hardware, firmware, software, or in combinations of them. The implementation can be as a computer program product, e.g., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

The computing device 400 can be operatively coupled to external equipment, for example factory automation or logistics equipment, or to a communications network, for example a factory automation or logistics network, in order to receive instructions and/or data from the equipment or network and/or to transfer instructions and/or data to the equipment or network. Computer-readable storage devices suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks.

In some embodiments, the computing device 400 can include user equipment. The user equipment can communicate with one or more radio access networks and with wired communication networks. The user equipment can be a cellular phone. The user equipment can also be a smart phone providing services such as word processing, web browsing, gaming, e-book capabilities, an operating system, and a full keyboard. The user equipment can also be a tablet computer providing network access and most of the services provided by a smart phone. The user equipment operates using an operating system such as Symbian OS, iPhone OS, RIM's Blackberry, Windows Mobile, Linux, HP WebOS, and Android. The screen might be a touch screen that is used to input data to the mobile device, in which case the screen can be used instead of the full keyboard. The user equipment can also keep global positioning coordinates, profile information, or other location information.

In some embodiments, the computing device 400 can include a server. The server can operate using an operating system (OS) software. In some embodiments, the OS software is based on a Linux software kernel and runs specific applications in the server such as monitoring tasks and providing protocol stacks. The OS software allows server resources to be allocated separately for control and data paths. For example, certain packet accelerator cards and packet services cards are dedicated to performing muting or security control functions, while other packet accelerator cards/packet services cards are dedicated to processing user session traffic. As network requirements change, hardware resources can be dynamically deployed to meet the requirements in some embodiments.

First Probe Placement Mechanism—Balancing Perpendicular Orientations of Probes

In some embodiments, the probe placement module 408 can be configured to place probes to balance the perpendicular orientations measured at probe locations. More particularly, the probe placement module 408 can be configured to place probes on one or more interest points in an image so that the histogram of perpendicular orientations, as measured at the location of the probes, is roughly uniform. This mode of operation can allow the probe placement module 408 to improve the accuracy of a model for objects with two degrees of freedom.

In some embodiments, the histogram of perpendicular orientations can include a plurality of orientation bins. Each orientation bin can correspond to a predetermined range of orientations. For example, the histogram of perpendicular orientations can include 180 bins, in which each orientation bin can cover the 2-degree range of an angle. Therefore, the histogram of perpendicular orientations can be indicative of a profile of perpendicular orientations as measured at interest points. In some embodiments, the histogram of perpendicular orientations can be represented as a continuous distribution.

In some embodiments, the probe placement module 408 can be configured to determine the histogram of perpendicular orientations associated with interest points. To this end, the probe placement module 408 can determine a perpendicular orientation associated with each of the interest points. For example, the probe placement module 408 can receive, from the IPD module 406 module, information that is representative of the perpendicular orientation at each of the interest points. As another example, the probe placement module 408 can compute the perpendicular orientation associated with each of the interest points. Subsequently, the probe placement module 408 can determine a histogram of perpendicular orientations measured at the plurality of interest points.

Figure 5:
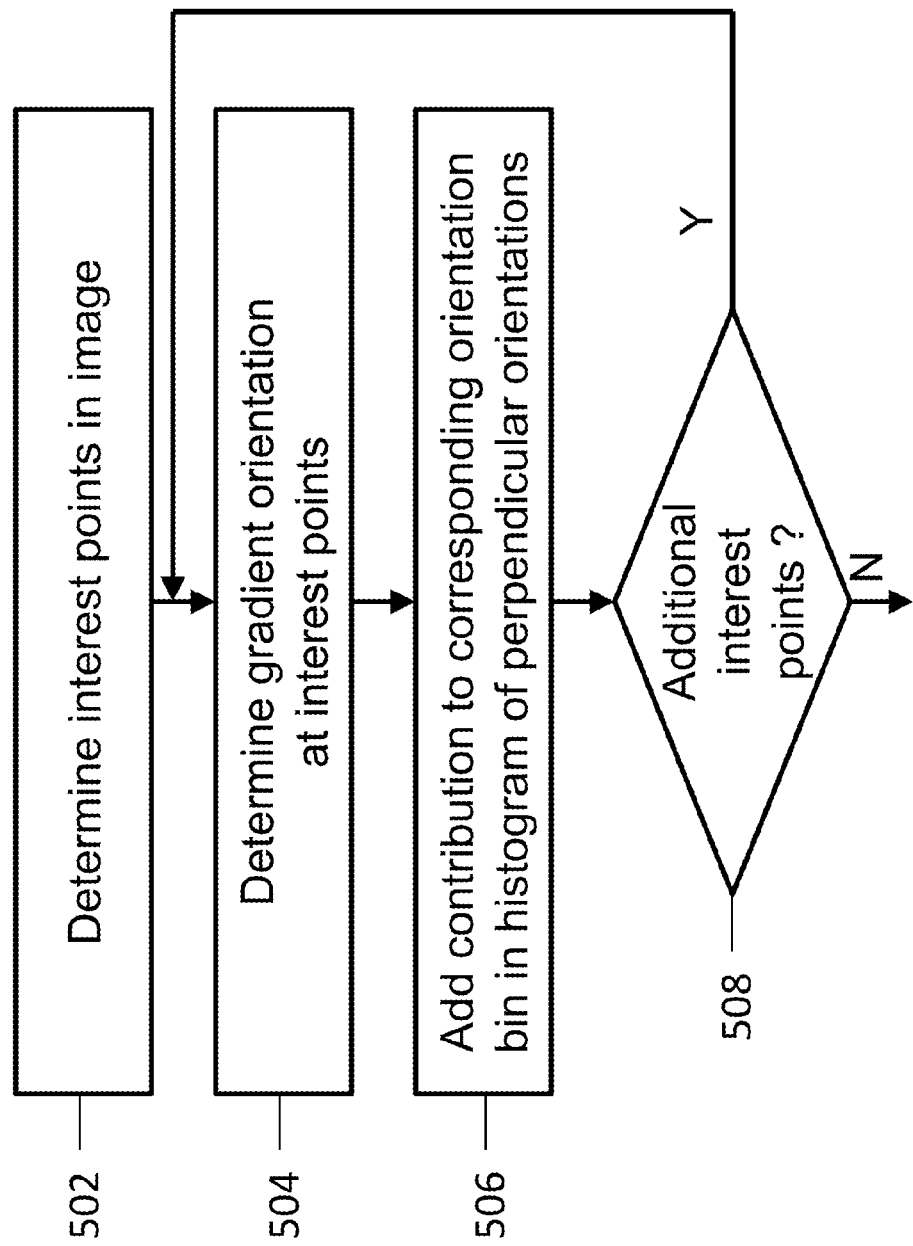
FIG. 5 illustrates a process for determining a histogram of perpendicular orientations for interest points of an image in accordance with some embodiments.

FIG. 5 illustrates a process for determining a histogram of perpendicular orientations for interest points in accordance with some embodiments.

In step 502, the IPD module 406 can determine interest points in an image. In some embodiments, the interest points can comprise a boundary of a pattern depicted in an image. In some cases, the IPD module 406 can identify the boundary of a pattern using an edge detection technique. For example, the IPD module 406 can perform an edge detection operation to identify a set of edge points believed to correspond to an edge. Each point can be associated with a position vector and a perpendicular vector that is perpendicular to a underlying structure. Subsequently, the IPD module 406 can chain the edge points to form a coherent boundary of a pattern. The edge detection technique can include, for example, a canny edge detection technique or a Hough transform technique. The edge detection technique can use one or more edge detection operators, including, for example, a Sobel operator, a Kirsch operator, a Prewitt operator, a Gabor filter, a Haar wavelet filter, any other filters that can detect a change in a pixel value in an image (e.g., a high frequency component of an image), and/or any combinations thereof.

In other embodiments, the interest points can include SIFT feature points. In such cases, the IPD module 406 can perform SIFT operations to identify SIFT feature points.

In some embodiments, the interest points can be placed uniformly on the boundary of a pattern. For example, the distance between any two adjacent interest points can be substantially identical. In this case, one may consider each interest point to be associated with the same arc length of the boundary.

Once at least one interest point is available, the FDC module 414 can receive, from the IPD module 406, the location of the at least one interest point. Then, the FDC module 414 can iterate the steps 504-508 to generate a histogram of perpendicular orientations measured at the at least one interest point.

In step 504, the FDC module 414 can select one of the at least one interest point and determine a perpendicular orientation at the selected interest point. In some embodiments, the FDC module 414 can receive perpendicular orientation information from the IPD module 406. In other embodiments, the FDC module 414 can itself determine the perpendicular orientation at the selected interest point. For example, the FDC module 414 convolves a gradient operator with the interest point to determine a perpendicular orientation. The gradient operator can include a Gabor filter, a Haar wavelet filter, a steerable filter, a x-directional gradient filter [−1, 0, 1], a y-directional gradient filter [−1, 0, 1]$^T$, and/or any combinations thereof. As another example, the FDC module 414 computes the perpendicular orientation associated with each of the interest points by, for instance, determining a gradient vector of a structure underling the interest points or determining an orientation of a line that joins two nearby points on the boundary of the structure.

In step 506, the FDC module 414 can add a contribution of the perpendicular orientation at the selected interest point to the histogram of perpendicular orientations. To this end, the FDC module 414 can determine an orientation bin, in the histogram, corresponding to the perpendicular orientation determined in step 504. For example, when the perpendicular orientation is 3-degrees with respect to the x-axis, the FDC module 414 can determine that the perpendicular orientation is associated with an orientation bin #1 that covers the orientation between 2-degrees and 4-degrees with respect to the x-axis. Subsequently, the FDC module 414 can add a vote to the orientation bin associated with the perpendicular orientation. For example, the FDC module 414 can increase a value of the orientation bin by one. As another example, the FDC module 414 can increase a value of the orientation bin by a weight. The weight can depend on the gradient vector associated with the interest point. For example, the weight can depend on a magnitude of the gradient vector.

In step 508, the FDC module 414 can determine whether there is any interest point that the FDC module 414 has not considered for the histogram of perpendicular orientations. If so, the FDC module 414 can go back to step 504 and iterate steps 504-508 until all interest points are considered by the FDC module 414. If the FDC module 414 has considered all interest points, then the FDC module 414 can output the histogram of perpendicular orientations.

Figure 6B:
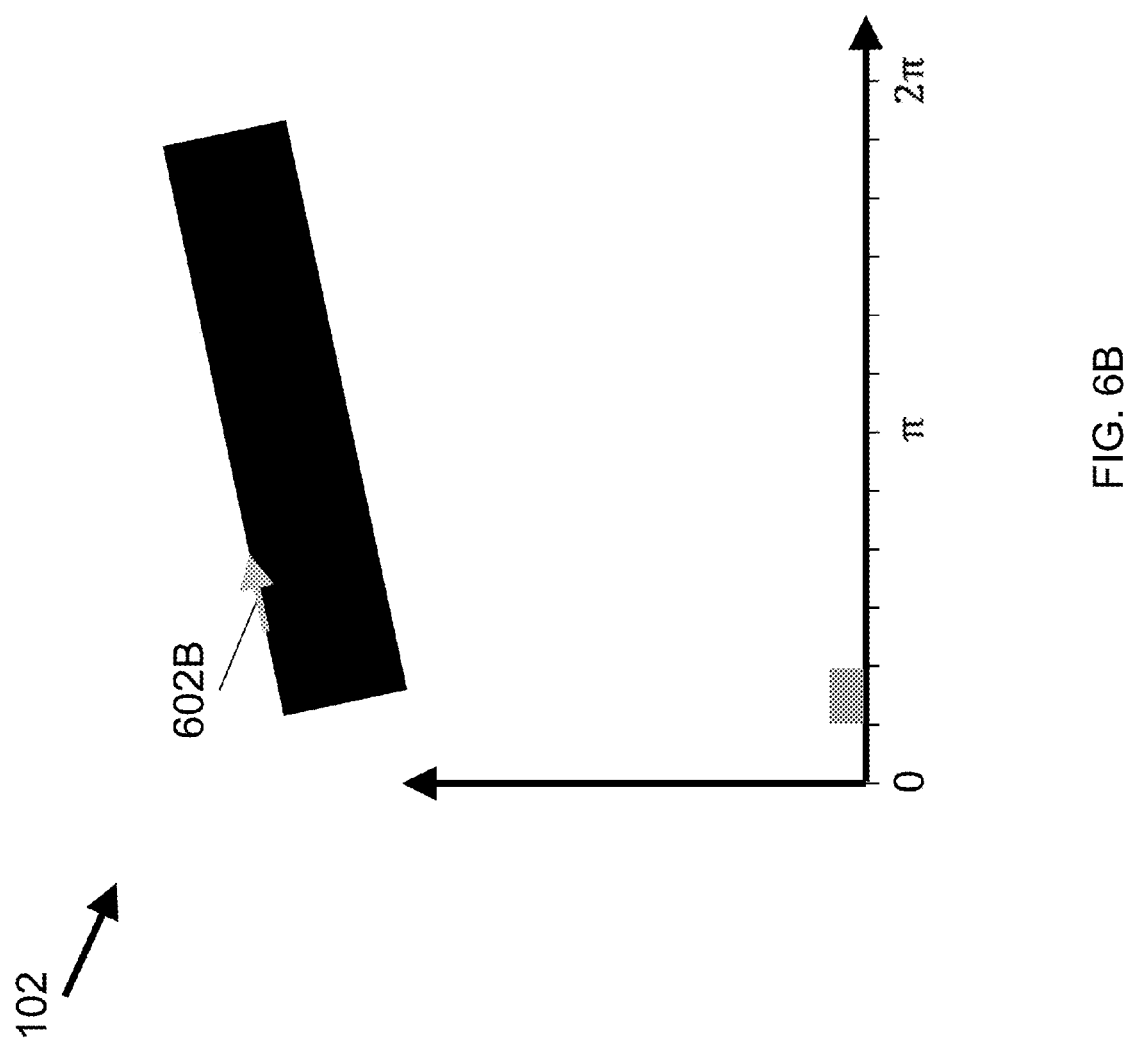
Figure 6C:
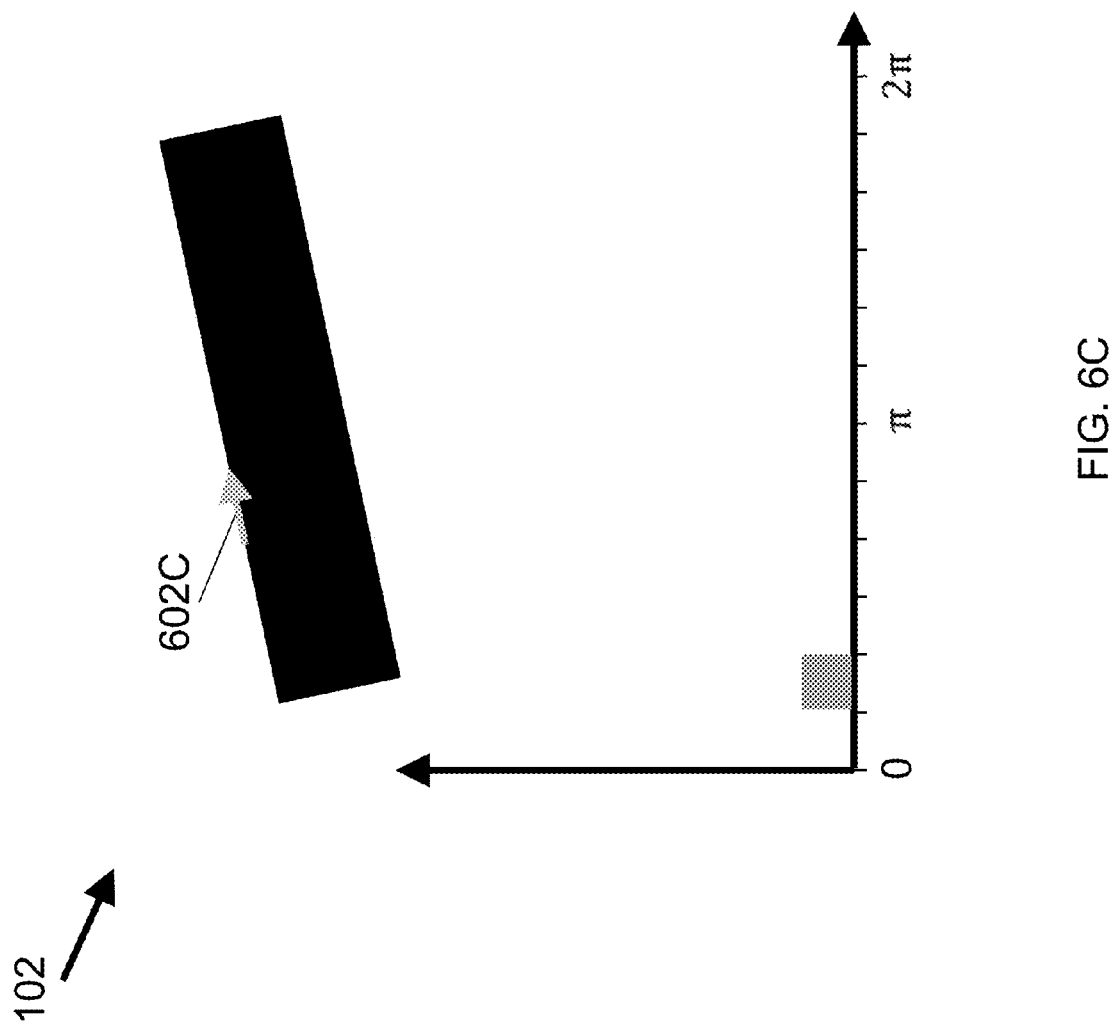
Figure 6D:
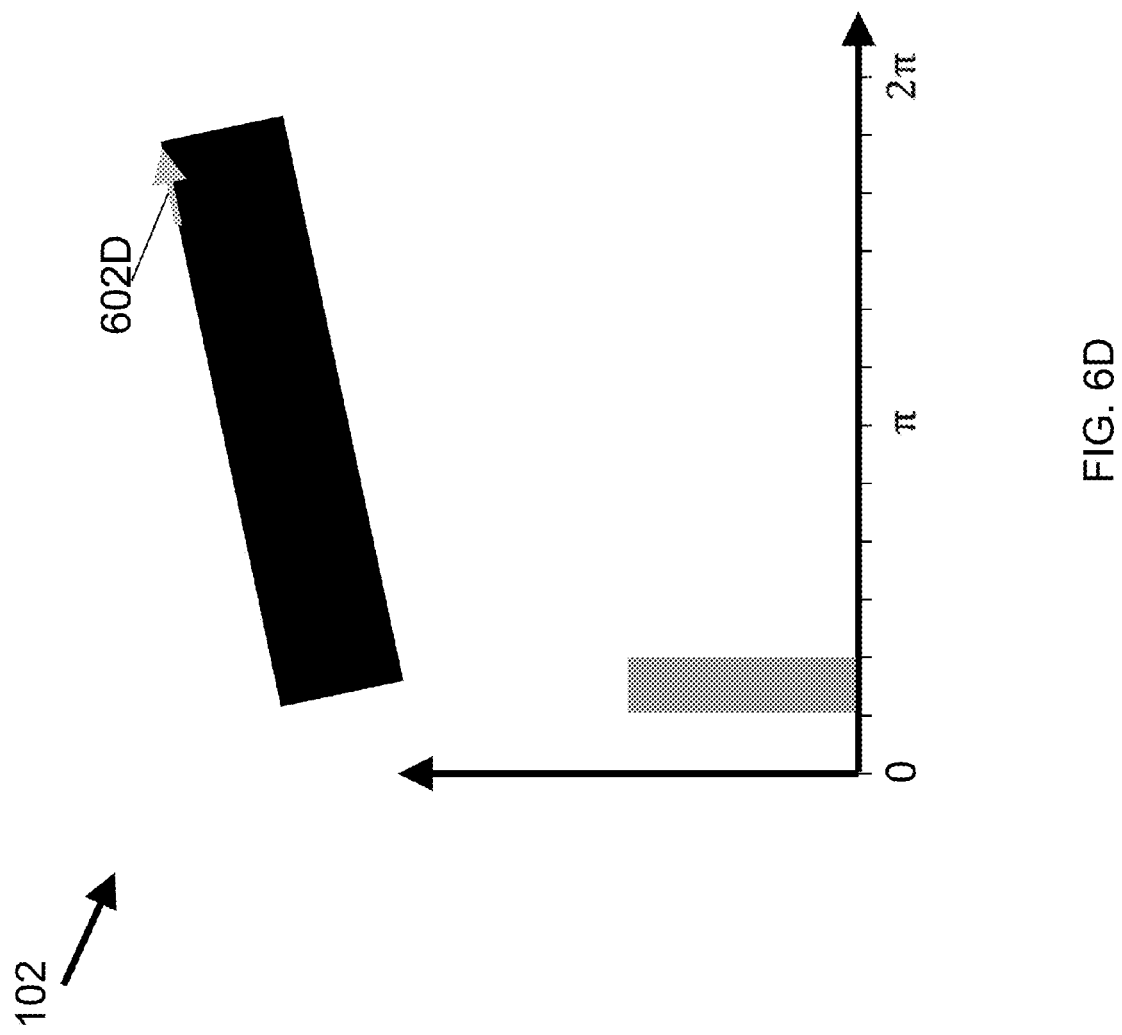
Figure 6E:
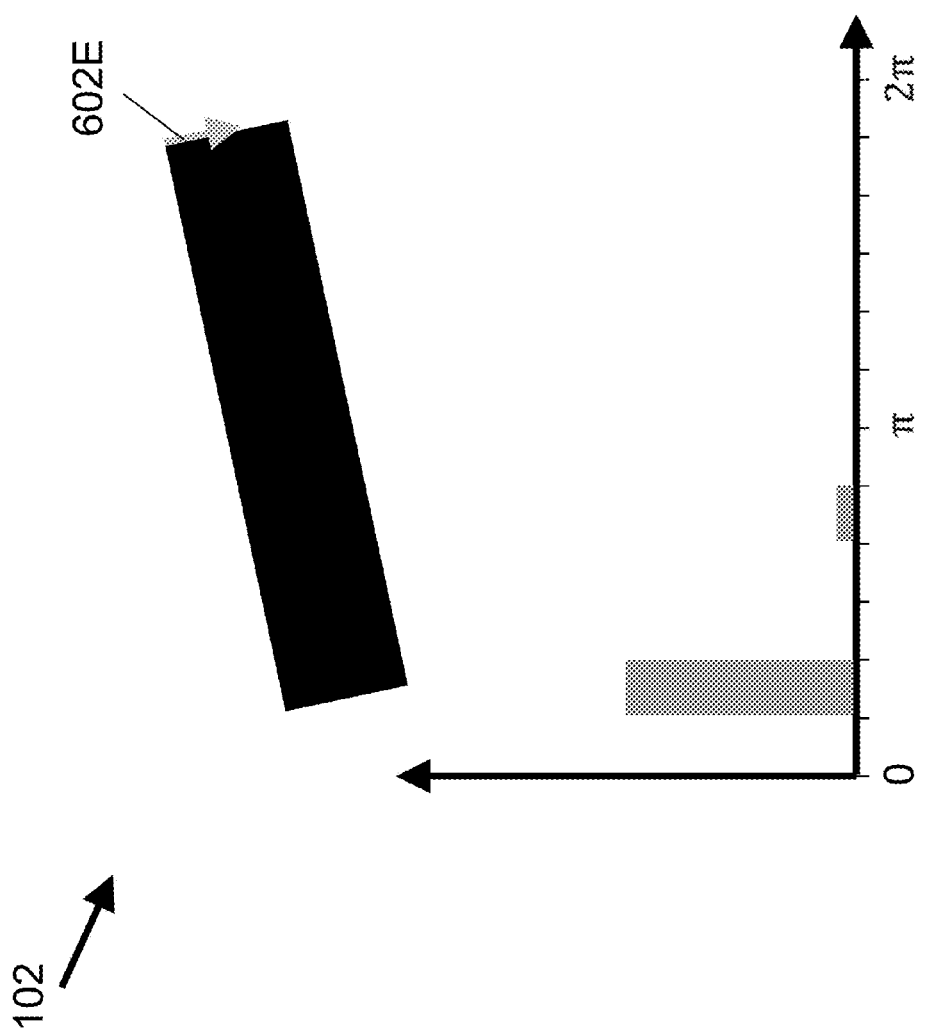
Figure 6F:
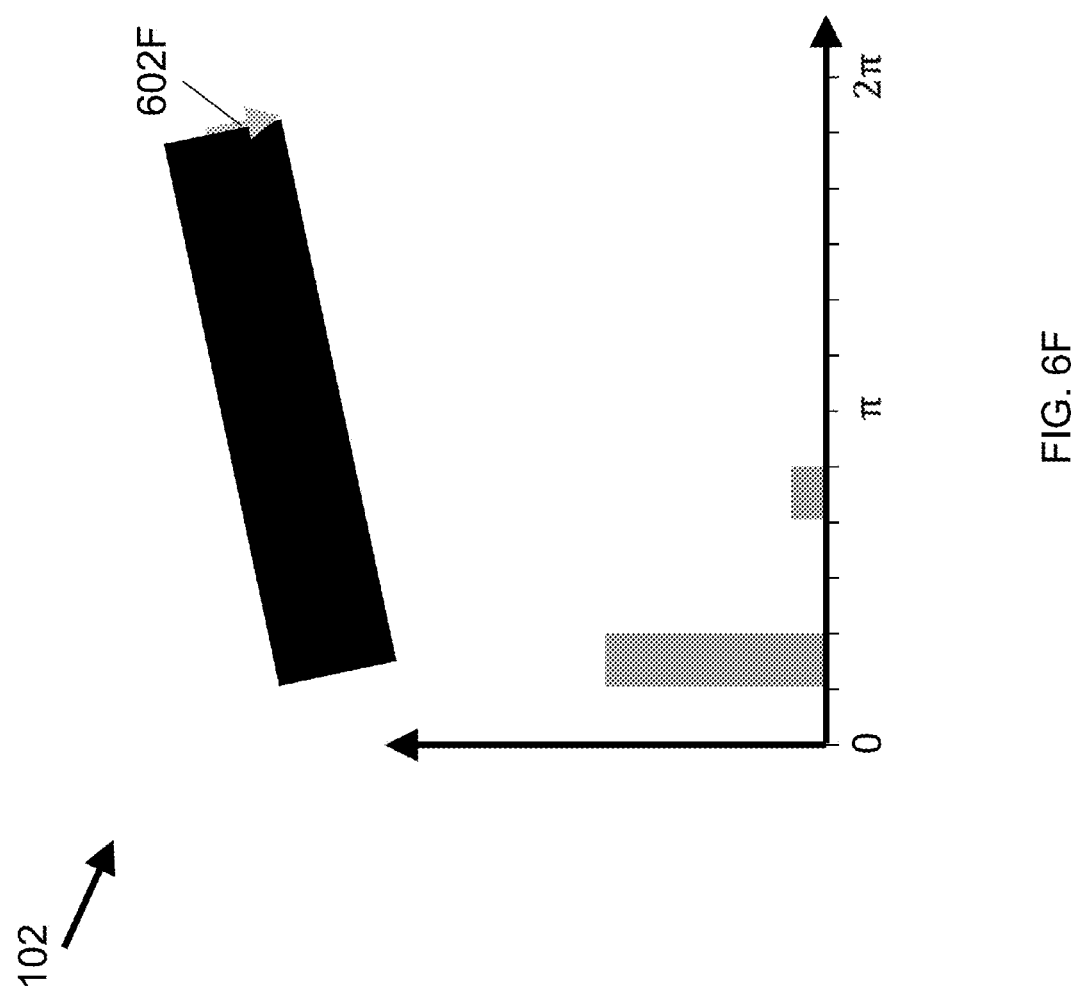
Figure 6G:
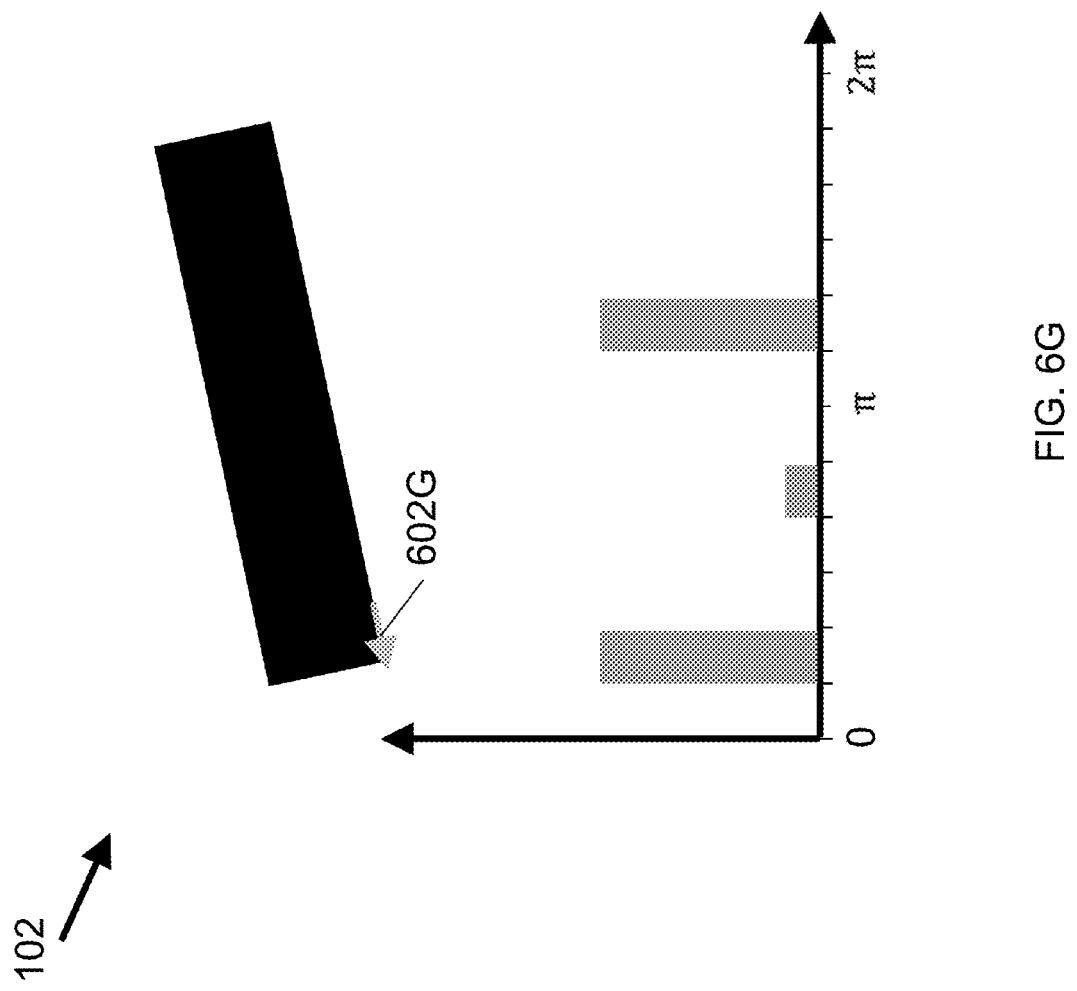
Figure 6H:
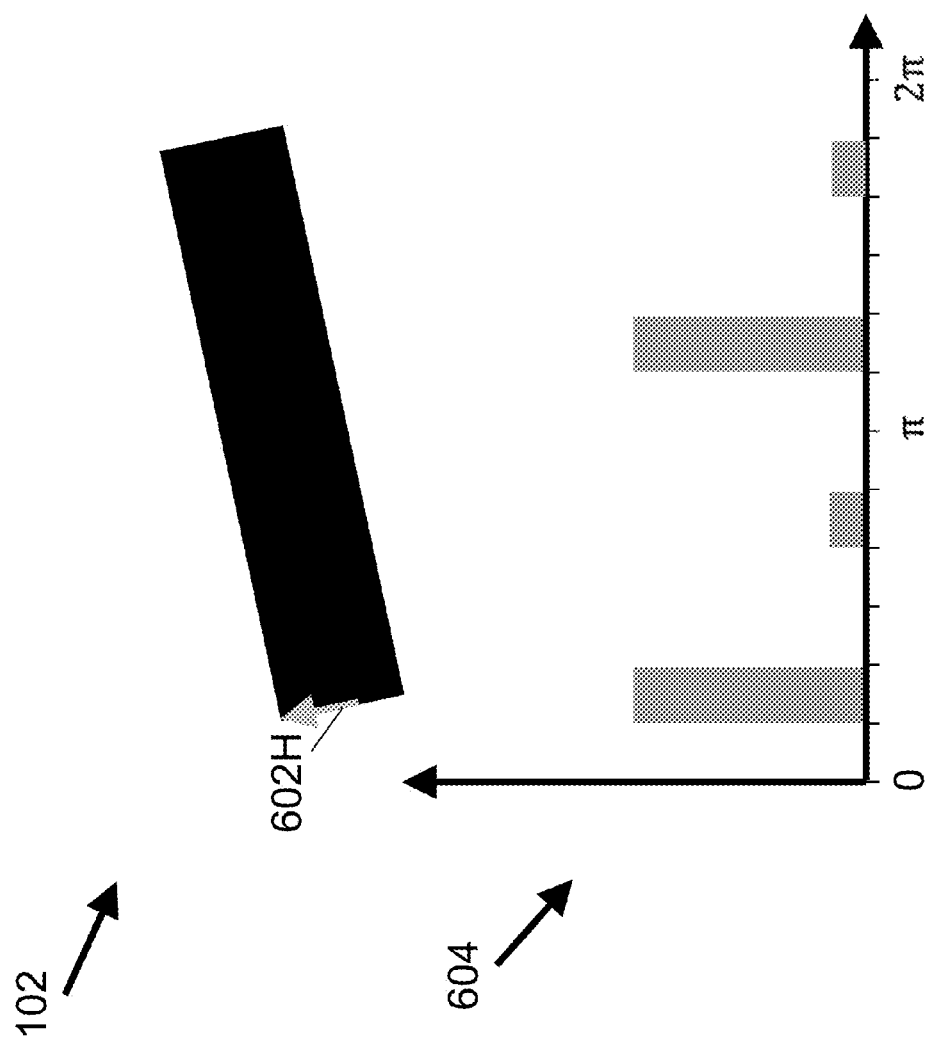

FIGS. 6A-6H illustrate a process for generating a histogram of perpendicular orientations in accordance with some embodiments. In this illustration, the center of each arrow 602 can be considered to correspond to an interest point, and the set of all interest points can be considered to comprise a boundary 102. As illustrated in FIG. 6A, the FDC module 414 can determine that the first interest point 602A is associated with an orientation bin covering a range of 0 and $$\frac{\pi}{6}.$$

Therefore, the FDC module 414 can increase a value associated with the orientation bin by one. As illustrated in FIGS. 6B-6H, the FDC module 414 can perform this operation for each interest point 602 on the boundary 102, and generate a corresponding histogram of perpendicular orientations 604.

In some embodiments, the TDC module 412 can be configured to generate a target distribution of probes. The target distribution of probes can be indicative of a desired placement of probes on one or more interest points. In some embodiments, the target distribution can include a plurality of orientation bins, where each orientation bin is associated with a value. In some cases, the target distribution can be a uniform distribution. In essence, the uniform target distribution indicates that the number of probes on interest points pointing to a particular orientation should be the same as the number of probes on interest points pointing to another orientation. This way, the probe placement module 408 can balance the number of probes pointing to different orientations.

In some cases, the target distribution can be a partially uniform distribution. For example, some of the orientation bins in the target distribution can have a value of zero and the remaining orientation bins can have the same value. In such cases, the target distribution's orientation bin can have a value of zero when the corresponding orientation bin in the histogram of perpendicular orientations 604 has a value of zero.

Once the FDC module 414 determines the histogram of perpendicular orientations and the TDC module 412 determines the target distribution, the PDM module 416 can determine the location of probes so that the distribution of the probes on one or more interest points matches the target distribution.

Figure 7:
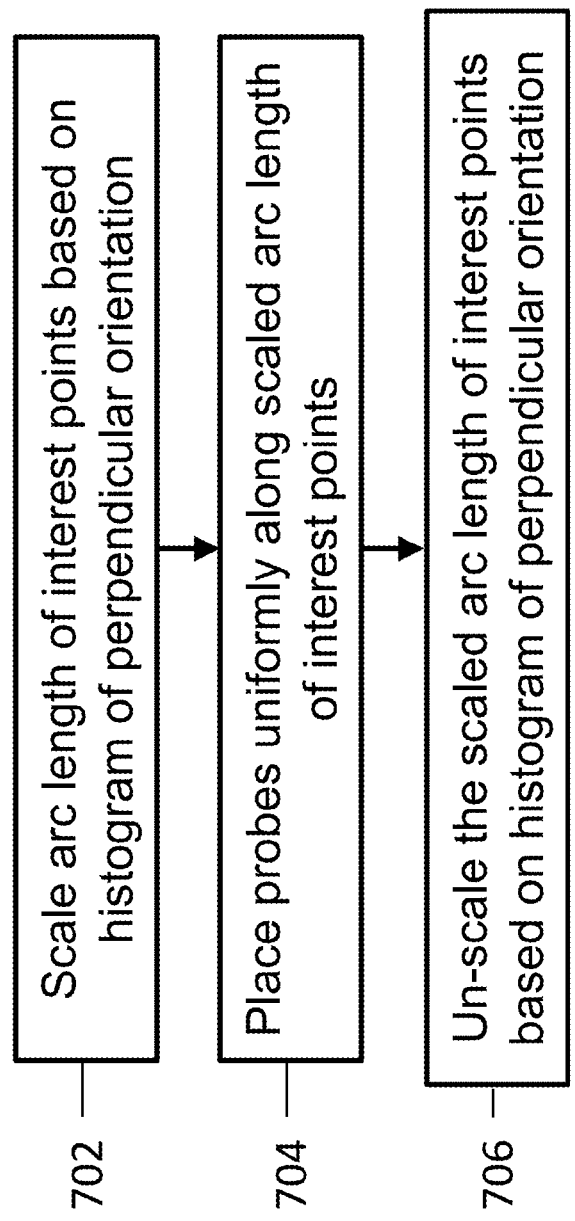
FIG. 7 illustrates a process for determining probe placements in accordance with some embodiments.

FIG. 7 illustrates a process for determining the placement of probes in accordance with some embodiments. In step 702, the PDM module 416 can use the histogram of perpendicular orientations to determine what portion of interest points are on a structure pointing to a particular orientation. For instance, when the histogram has 180 orientation bins, the PDM module 416 can use the histogram to determine a proportion of interest points pointing to a particular orientation with a 2-degree resolution. Subsequently, the PDM module 416 can scale the arc length of interest point based on the value of the histogram bin corresponding to the interest point. More particularly, the PDM module 416 can adjust the arc length of an individual interest point in a manner inversely proportional to the value of the histogram bin associated with the individual interest point.

For example, referring to an example illustrated in FIG. 3, the number of interest points along the short edge 104 can be small compared to the number of interest points along the long edge 106. Therefore, the value of a bin in the histogram corresponding to the short edge 104 can be smaller than the value of a bin corresponding to the long edge 106. Based on this, the PDM module 416 can increase the arc length of interest points (e.g., a boundary section) along the short edge 104 and reduce (or leave unaltered) the arc length of interest points along the long edge 106.

Figure 8:
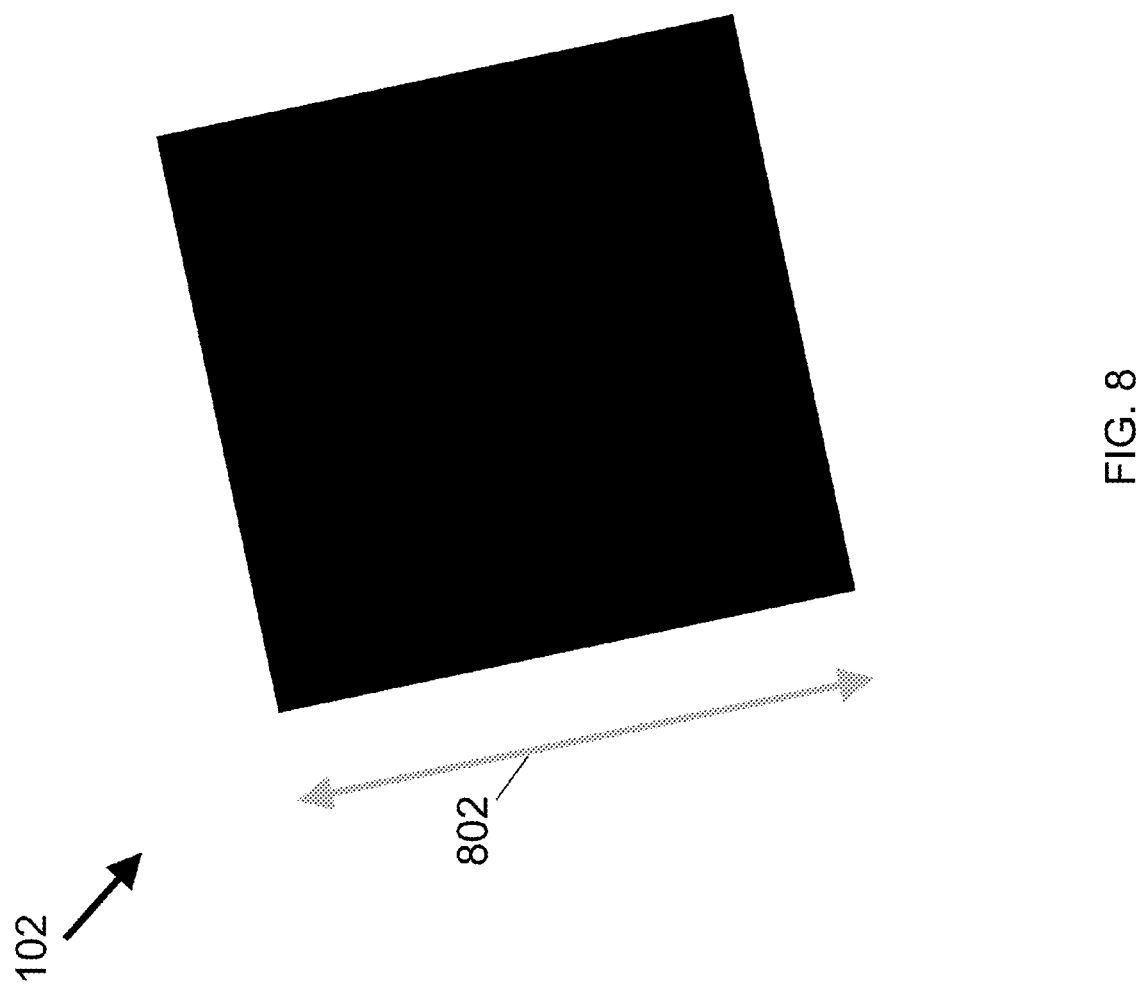
FIG. 8 illustrates scaling of act lengths associated with interest points of an image in accordance with some embodiments.

FIG. 8 illustrates the scaling of arc length of interest points for a boundary in accordance with some embodiments. Since the histogram indicates that the number of interest points on a vertical edge is less than the number of interest points on a horizontal edge, the PDM module 416 can increase the arc length of interest points on the vertical edge. The increased arc length of interest points can be thought of increasing a length of the boundary along the vertical edge, as illustrated by the arrow 802.

Figure 9:
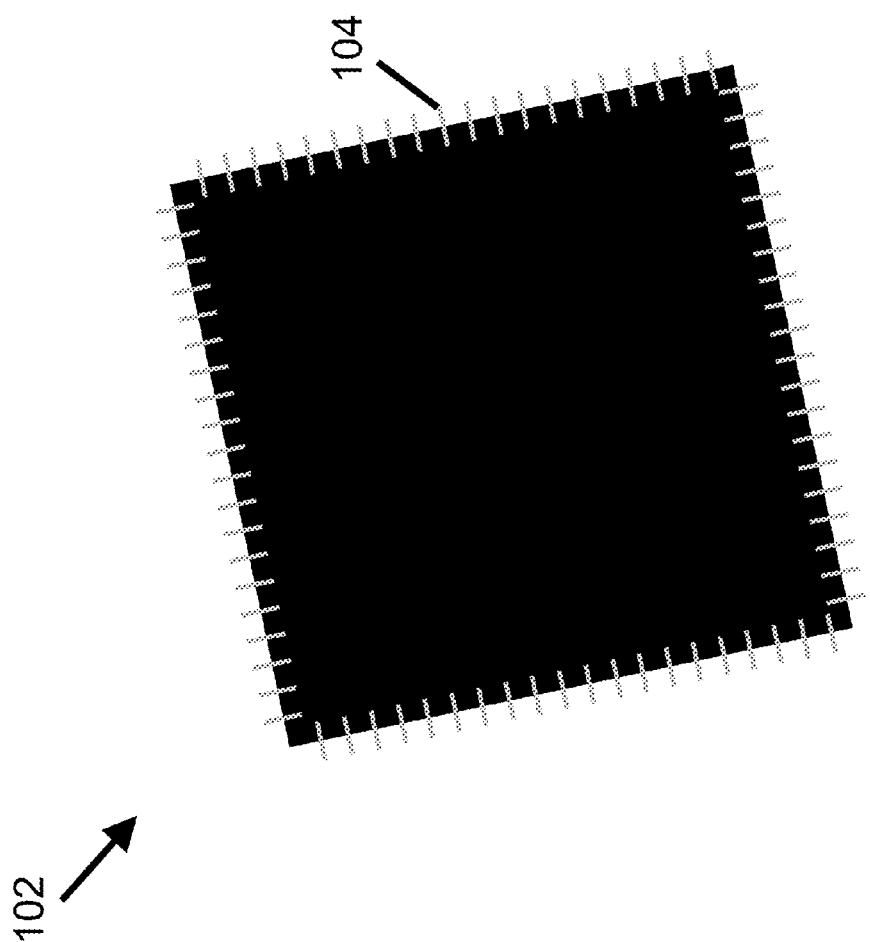
FIG. 9 illustrates uniform placement of probes on scaled interest points in accordance with some embodiments.

In step 704, the PDM module 416 can place probes on the scaled boundary in a uniform manner. FIG. 9 illustrates a uniform placement of probes on a scaled boundary in accordance with some embodiments. Since the vertical edge of the boundary has been scaled, the uniform placement of probes 104 on the scaled vertical edge can result in roughly the same number of probes 104 on vertical edges and horizontal edges.

In some embodiments, the PDM module 416 can place probes uniformly on the scaled boundary sequentially. For example, the PDM module 416 starts at an initial interest point (which may be arbitrarily selected) and place a first probe at the initial interest point. Subsequently, the PDM module 416 can place the second probe at an interest point that is separated by the predetermined distance from the first probe. This process can be iterated until the PDM module 416 has considered all the plurality of interest points.

In step 706, the PDM module 416 can reverse the scaling operation from step 702, thereby also adjusting the distance between uniformly placed probes. FIG. 10 illustrates a reverse scaling of the scaled boundary in accordance with some embodiments. Along with the reverse scaling of the boundary, the distance between two adjacent probes 104 is also scaled correspondingly. Therefore, the density of the probes along the vertical edge becomes higher compared to the density of probes along the horizontal edge. This way, as shown by the distribution 1002, the PDM module 416 can balance the histogram of perpendicular orientations measured at the probe locations. The balanced histogram of perpendicular orientations 1002 generally indicates that the directional information derived from the probes 104 is also balanced.

In some embodiments, the PDM module 416 can be configured to perform the arc length scaling and reverse scaling without actually stretching the arc length of interest points (e.g., boundary sections) graphically. For example, the PDM module 416 can be configured to increase or decrease the resolution of the underlying coordinate system around the interest point in order to effectively scale the arc length of the interest point.

In some embodiments, the PDM module 416 can merge the steps 704 and 706 by sequentially placing probes. For example, the PDM module 416 can determine the uniform distance that should separate two probes. Then the PDM module 416 starts at an initial interest point (which may be arbitrarily selected) and places a first probe at the initial interest point. Subsequently, the PDM module 416 can determine the arc length associated with the initial interest point based on the histogram of perpendicular orientations. Then, the PDM module 416 can scale the uniform distance as a function of the arc length to determine the scaled distance between the first probe and a second probe to be placed adjacent to the first probe. Subsequently, the PDM module 416 can place the second probe at an interest point that is separated by the scaled distance from the first probe. This process can be iterated until the PDM module 416 has considered all the plurality of interest points. This way, the PDM module 416 can perform the steps 704 and 706 without graphically scaling the boundary of a pattern.

In some embodiments, the FDC module 414 can perform a low-pass filtering operation on the histogram of perpendicular orientations prior to scaling the arc length of interest points in step 702. There may be several benefits to performing a low-pass filtering operation prior to scaling the arc length of interest points. First, the low-pass filtering operation can allow the probe placement module to remove noise from the histogram of perpendicular orientations.

Second, the low-pass filtering can address the division by zero problem. The PDM module 416, which performs the arc length scaling, would often use the value of an orientation bin in the histogram of perpendicular orientations as a denominator. However, there may be some orientation bins with the value of 0, which may cause the division by zero problem. The low-pass filtering operation can address this issue by effectively eliminating orientation bins with a value of zero.

Third, the low-pass filtering operation can allow the probe placement module to discount a particular orientation bin that is grossly under-represented when the neighboring orientation bins are well represented. For example, the histogram of perpendicular orientations can indicate that the pattern has 100 interest points on a structure with a perpendicular orientation of 89 degrees, 100 interest points on a structure with a perpendicular orientation of 91 degrees, but only 1 interest point on a structure with a perpendicular orientation of 90 degrees. Without low-pass filtering, the PDM module 416 would likely increase the number of probes around the interest point with a perpendicular orientation of 90 degrees while limiting the number of probes around the interest points with a perpendicular orientation of 89 or 91 degrees. Such a drastic measure to balance the histogram of perpendicular orientations may be ineffective in capturing balanced information from probes because similar orientations can capture similar information. In other words, probes pointing to a perpendicular orientation of 89 or 91 degrees can capture substantially similar information as probes pointing to a perpendicular orientation of 90 degrees. Therefore, increasing the number of probes pointing to a perpendicular orientation of 90 degrees may be ineffective in capturing balanced information across the full range of angles, especially when the total number of probes is limited.

Low-pass filtering can address this issue because by low-pass filtering the histogram of perpendicular orientations, the value of the orientation bin for 90 degrees can be smoothed (e.g., averaged) with the values of the orientation bins for 89 degrees and 91 degrees. Therefore, the low-pass filtering operation can substantially increase the value of the orientation bin for 90 degrees. This way, the PDM module 416 can recognize that the information around the perpendicular orientations of 90 degrees is well captured by probes pointing to 89 degrees and 91 degrees. Therefore, the PDM module 416 would not drastically increase the number of probes pointing to 90 degrees.

In some embodiments, the FDC module 414 can perform the low-pass filtering operation by convolving the histogram with a kernel. In some cases, the FDC module 414 can be configured to perform a circular convolution. For example, under the circular convolution, the FDC module 414 can wrap the kernel around the limits of the orientation domain (e.g., 0-2π) of the histogram. The kernel for the low-pass filtering operation can include a raised cosine kernel, a cosine-squared kernel, or any other circular functions that can smooth the histogram. The FDC module 414 can control the width of the kernel to control an amount of smoothing to be performed on the histogram. For example, the width of the kernel can cover 2π/N, where N can be any integer number.

In some embodiments, instead of increasing the density of probes along the shorter edge as in FIG. 10, the PDM module 416 can be configured to initialize probes on interest points, and determine the weights associated with the initialized probes. For example, when a probe is associated with a short edge (e.g., the probe is placed on an edge corresponding to an orientation bin with a small value), the PDM module 416 can increase the weight associated with the probe; when a probe is associated with a long edge (e.g., the probe is placed on an edge corresponding to an orientation bin with a large value), the PDM module 416 can decrease the weight associated with the probe. Subsequently, the weights can be used to vary the contribution of the probes for various applications, e.g., alignment of the boundary. Using this technique, the PDM module 416 can reduce the computational power needed to (1) increase the density of probes along the short edge and (2) match the increased number of probes during alignment. However, the PDM module 416 may reduce the resolution of the probes compared to using the process in FIG. 7.

Second Probe Placement Mechanism—Sampling Probes from a Distribution

In some embodiments, the probe placement module 408 can be configured to place probes on one or more interest points by sampling probes from a target distribution of probes. The target distribution of probes can include random variables corresponding to degrees of freedom associated with the pattern. For example, when an object associated with the pattern is allowed to move in two dimensions (e.g., translational movement), the target distribution can have two random variables: x coordinate and y coordinate (or other equivalent representations.) As another example, when an object associated with the pattern is allowed to make a translational movement and a rotational movement, the target distribution can have three random variables: x coordinate, y coordinate, and a rotational vector (e.g., an orientation.) As another example, when an object associated with the pattern is allowed to make a translational movement, a rotational movement, and a scaling movement (e.g. a movement away from or towards an imaging device), the target distribution can include four random variables: x coordinate, y coordinate, rotation, and scale.

In some embodiments, the probe placement module 408 can represent the target distribution as a non-parametric distribution. For example, the probe placement module 408 can quantize the domain of each random variable into a plurality of bins, and simply count the number of interest points that fall into corresponding bins. In other embodiments, the probe placement module 408 can represent the target distribution as a parametric distribution.

In some embodiments, the probe placement module 408 can determine the target distribution using a TDC module 412. The TDC module 412 can be configured to determine the target distribution of probes based on features associated with the interest points. For example, the TDC module 412 can determine the target distribution based on one or more of, for example, the coordinate of the interest points, the perpendicular orientation associated with the interest points, the rotation of the interest points, or the scale of the interest points.

Figure 11A:
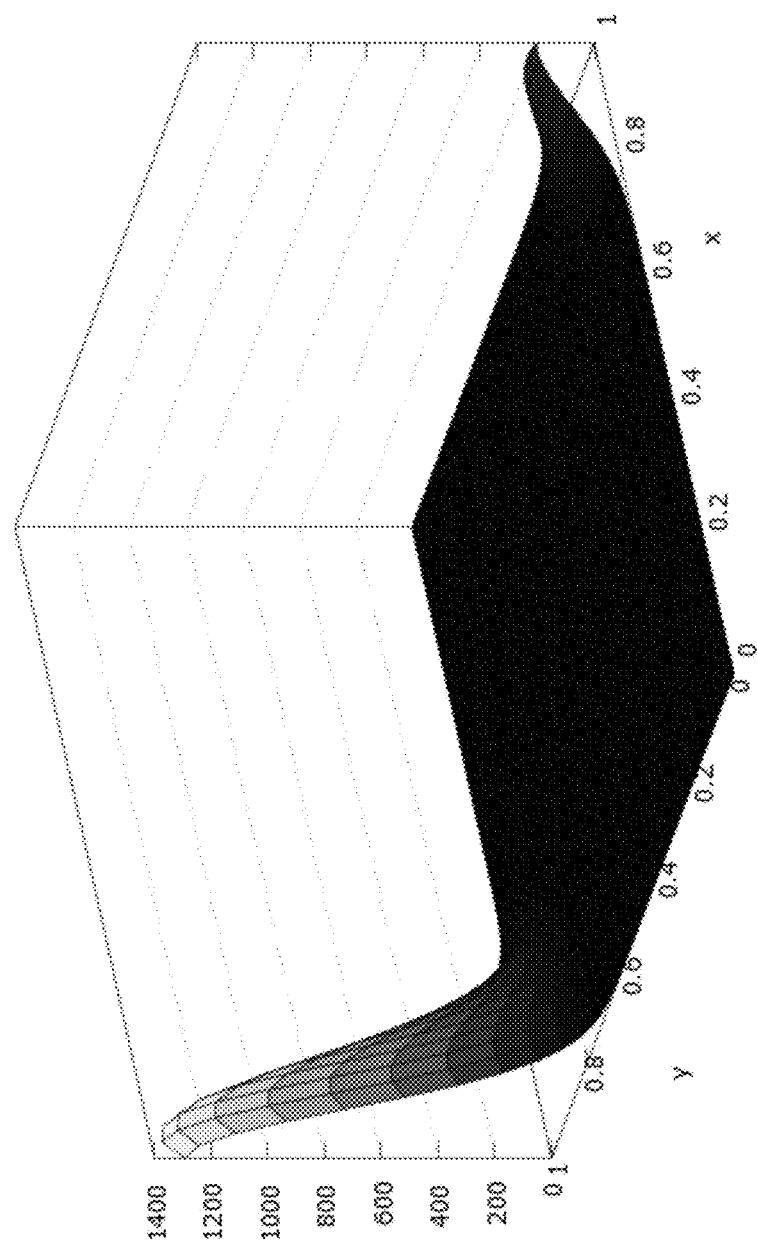
FIGS. 11A-11B illustrate probe balancing by sampling probes from a target distribution in accordance with some embodiments.
Figure 11B:
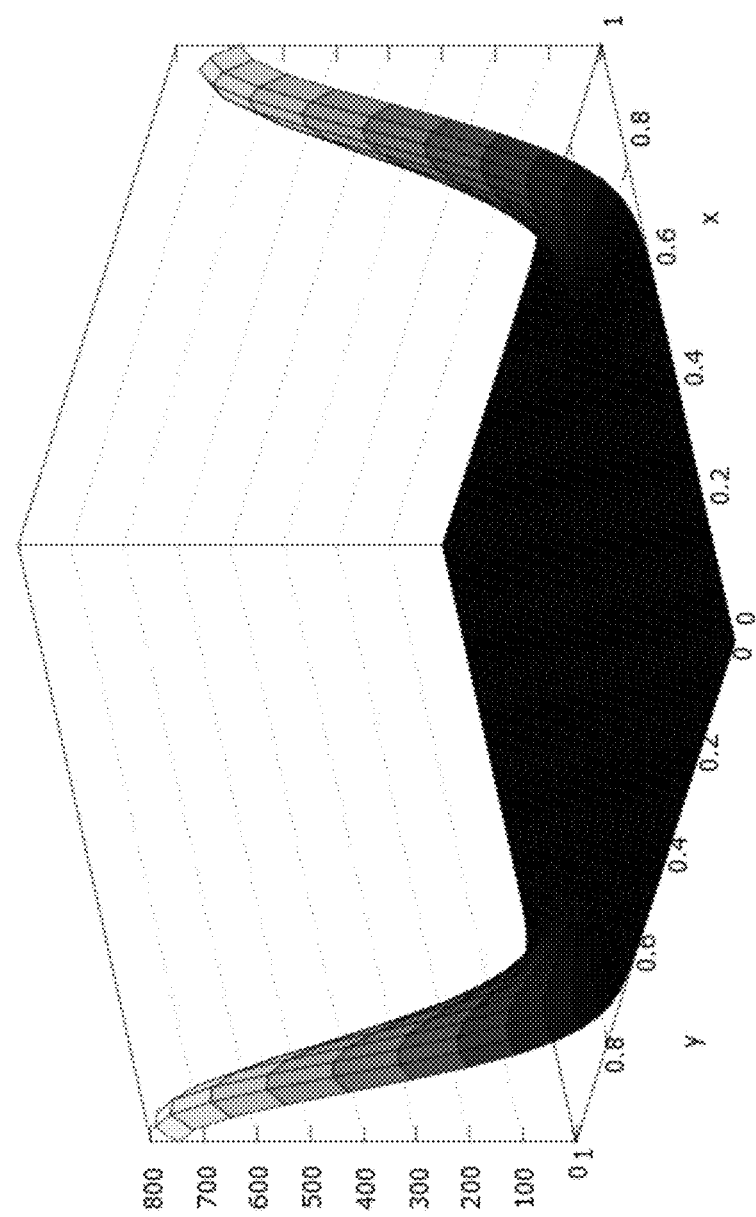

In some embodiments, the TDC module 412 is configured to determine the target distribution such that the distribution of perpendicular orientations sampled from the target distribution is substantially balanced. For instance, suppose that the pattern of interest is a horizontal rectangle, as shown in FIG. 1. Such a pattern may be associated with a model having a gradient vector distribution as shown in FIG. 11A. As shown in FIG. 11A, there are considerably more edges having a large y-directional component compared to edges having a large x-directional component. Therefore, the target distribution for the pattern in FIG. 1 should be such that the probes drawn from the target distribution would have a balanced gradient distribution as shown in FIG. 11B.

In some embodiments, the TDC module 412 is configured to determine the target distribution so that the target distribution has a similar support as the distribution of interest points. This is important because in these embodiments the probe placement module 408 is configured to sample the probes by re-sampling (e.g., importance sampling) from the existing set of interest points. To this end, the TDC module 412 is configured to use a mixture model for both the interest point distribution and the target distribution, as discussed below.

In some embodiments, the TDC module 412 provides the target distribution to the PDM module 414, and the PDM module 414 is configured to draw samples from the target distribution to determine the location of probes.

In some embodiments, the PDM module 414 can use an importance sampling technique to draw samples from the target distribution. In other embodiments, the PDM module 414 can be configured to determine a boundary of a pattern, and generate probe samples along the boundary of a pattern. This technique can be useful when drawing only a small number of probes from the target distribution. This technique has the advantage that the set of probes generated by the sampling may not be affected by random fluctuations in the re-sampling process and can guarantee that the probes are dispersed across the full geometric extent of the pattern's boundary.

Target Distribution Computation

When a pattern has two degrees of freedom (e.g., translational movement,) the TDC module 412 can determine a weighting function $f(x, y)$ that satisfies the following relationships:

$$\sum_i x_i f(x_i, y_i) = \sum_i y_i f(x_i, y_i)$$

$$f(x_i, y_i) \geq 0, \forall i$$

and:

$$\sum_i f(x_i, y_i) \neq 0$$

where i indexes the $i^{th}$ interest point. The objective of this optimization routine is to identify a function $f(x, y)$ that equates (1) the weighted summation of gradient vectors' x-components measured at the interest points and (2) the weighted summation of gradient vectors' y-components measured at the interest points. In some cases, the TDC module 412 can balance only the magnitude of the gradient vectors. Therefore, $x_i$ can refer to the absolute value of the x component of the gradient vector measured at the $i^{th}$ interest point; and $y_i$ can refer to the absolute value of the y component of the gradient vector measured at the $i^{th}$ interest point.

Once the TDC module 412 determines the weighting function $f(x, y)$, the TDC module 412 can provide the weighting function $f(x, y)$ to the PDM module 416. In some embodiments the weighting function may take the form of a probability distribution which the PDM module 416 can use to place the probes on one or more interest points. Since the PDM module 416 in this case uses the weighting function $f(x, y)$ as a probability distribution from which to sample probes, it must be constrained to be non-negative and can be positive at least for some gradient components (x, y). For such embodiments the term "target distribution" will be used to refer to the probability distribution here denoted $f(x, y)$.

In some embodiments, the weighting function is used to weight an existing set of probes chosen through some other means, to affect their relative importance in such a way as to minimize:

$$\sum_i |x_i - y_i| f(x_i, y_i)$$

$$f(x_i, y_i) \geq 0, \forall i$$

and:

$$\sum_i f(x_i, y_i) \neq 0.$$

When a pattern has three degrees of freedom (e.g., translational movement and rotational movement,) the TDC module 412 can incorporate, into the target distribution, a rotational variable θ corresponding to a rotational movement. The TDC module 412 can define the rotational variable θ with respect to an origin.

In some embodiments, the origin can be the center-of-mass of the plurality of interest points. In some embodiments, the origin can be the center of rotation. The center of rotation can be the point about which the moment of rotation is minimized. The center of rotation corresponds to a unique global minimum, and is independent of the choice of basis vectors (e.g., a coordinate system). Therefore, the center of rotation is a geometric quantity that is intrinsic to the plurality of interest points. The center of rotation can be computed as follows:

$$C_r = [\varphi u u^T ds]^{-1} X^{-1} \varphi u p^T X u ds$$

where p is a reference vector with respect to a reference point (which may be arbitrary), u is a unit normal vector at a particular interest point, and X is a cross product matrix. FIG. 11 illustrates the relationship between the reference vector p and the unit normal vector u in accordance with some embodiments. In an orthonormal basis, $$X = \begin{pmatrix} 0 & 1 \\ -1 & 0 \end{pmatrix}.$$

For computational purposes, the center of rotation in a coordinate system with orthonormal basis can be computed as follows:

$$\begin{pmatrix} c_{rx} \\ c_{ry} \end{pmatrix} = \begin{pmatrix} \oint u_x^2 ds & \oint u_x u_y ds \\ \oint u_x u_y ds & \oint u_y^2 ds \end{pmatrix}^{-1} \begin{Bmatrix} \oint (p_y u_x u_y - p_x u_y^2) ds \\ \oint (p_x u_x u_y - p_y u_x^2) ds \end{Bmatrix}$$

where the subscripts x and y refer to the x and y components of the corresponding vector.

Figure 12A:
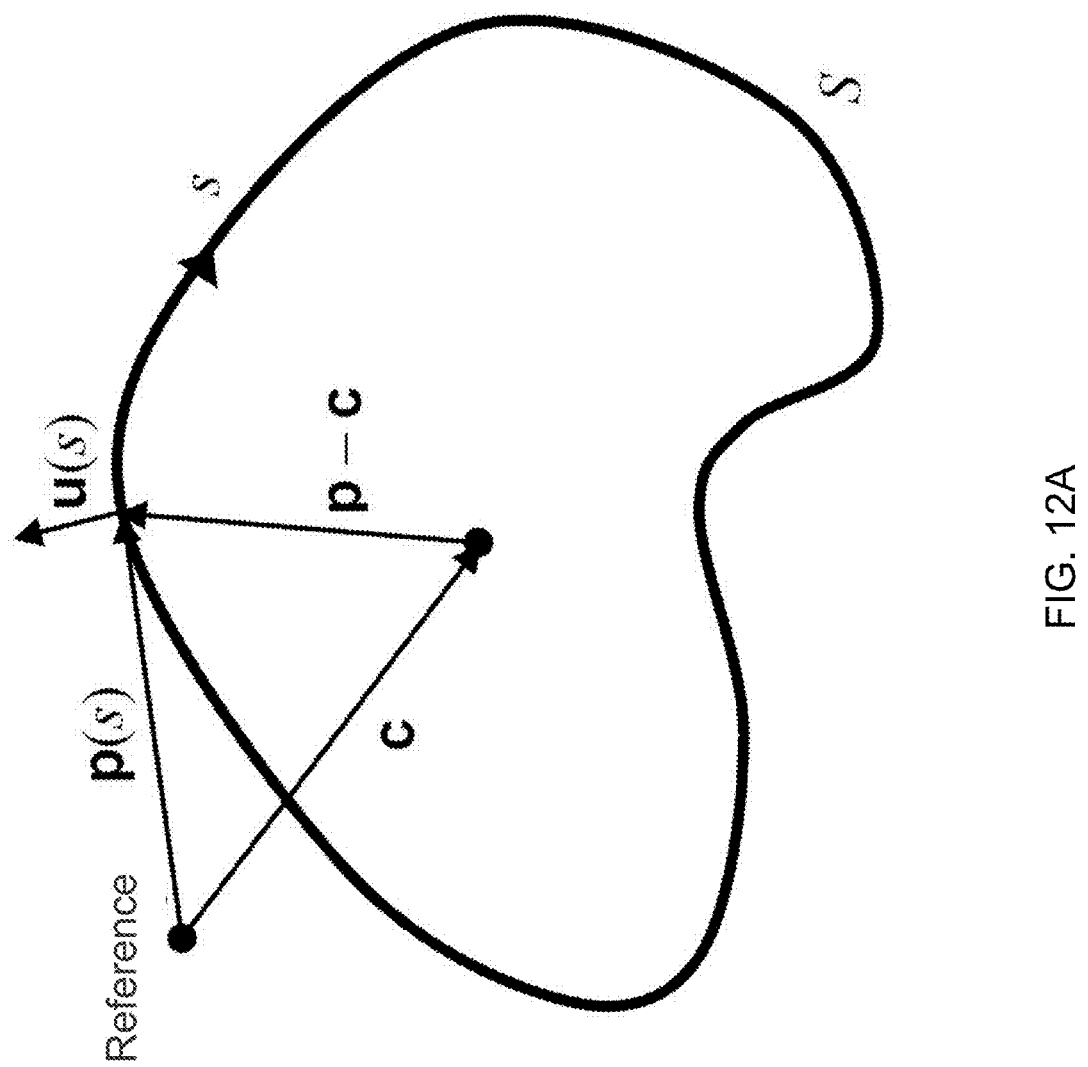
FIG. 12A illustrates a relationship between a reference vector and a unit normal vector in accordance with some embodiments
Figure 12B:
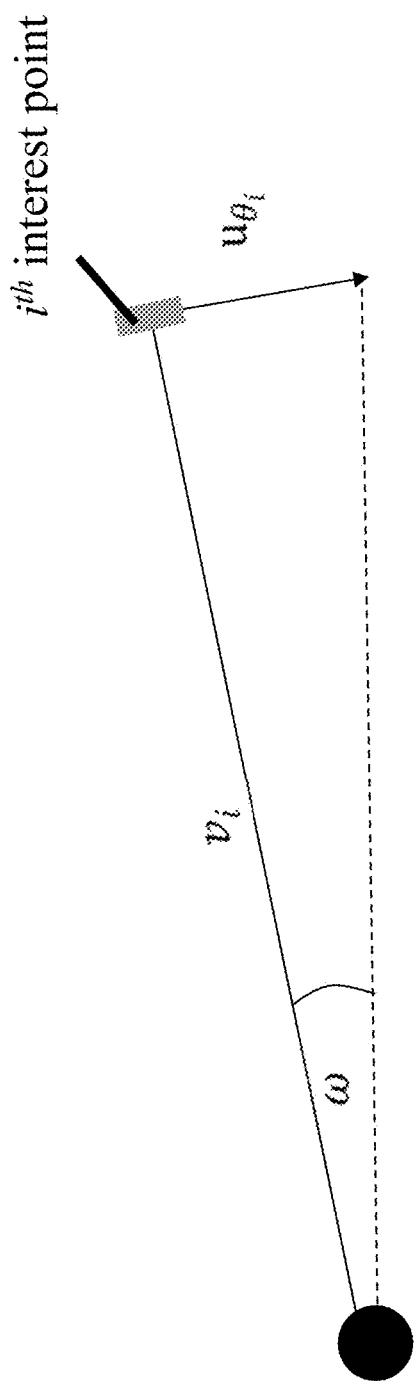
FIG. 12B illustrates a relationship between a position vector $v_i$ and a unit rotational vector $u_{\theta_i}$ in accordance with some embodiments.

Once the origin is determined, the TDC module 412 can determine the rotational variable θ using a position vector $v_i$ of the $i^{th}$ interest point, which is a vector from the origin to the center of the $i^{th}$ interest point, and a rotational unit vector $u_{\theta_i}$ at the center of the $i^{th}$ interest point. FIG. 12 illustrates the relationship between a position vector $v_i$ and a unit rotational vector $u_{\theta_i}$ in accordance with some embodiments.

In some embodiments, the rotational variable $\theta_i$ can be independent of the norm of the position vector $v_i$. The rotational variable $\theta_i$ that is independent of the norm of the position vector $v_i$ can provide a target distribution that would not distinguish probe locations based on the norm of the position vector $v_i$. For example, the TDC module 412 can define the rotational variable $\theta_i$ for the $i^{th}$ interest point as follows:

$$\theta_i = \frac{\|v_i \cdot u_{\theta_i}\|}{\|v_i\|}$$

This representation of the rotational variable $\theta_i$ may be useful for coarsely aligning shapes with large angular step sizes ω.

In some embodiments, the rotational variable $\theta_i$ can take into account the norm of the position vector $v_i$. Since $$\frac{d\omega}{d\|v_i\|}$$

or $$\frac{1}{\|v_i\|^2},$$

the TDC module 412 can emphasize the contribution of interest points that are further away from the origin in order to increase the angular precision. For example, the TDC module 412 can define the rotational variable $\theta_i$ for the $i^{th}$ interest point as follows:

$$\theta_i = \frac{\|v_i\| \times \bar{u}_i^{(\theta)} \cdot \bar{d}_i}{\frac{1}{N} \sum_{i=0}^{N} \|v_i\|} \text{ or,}$$

$$\theta_i = \frac{\|v_i\|^2 \times \bar{u}_i^{(\theta)} \cdot \bar{d}_i}{\frac{1}{N} \sum_{i=0}^{N} \|v_i\|^2}.$$

The rotational variable $\theta_i$ that depends on the norm of the position vector $v_i$ can provide a target distribution that would favor placing probes at locations further away from the origin. This way, the target distribution can cause more probes to be sampled in interest points further away from the origin.

In some embodiments, the TDC module 412 can determine the representation for the rotational variable $\theta_i$ based on the shape of the pattern. For example, the TDC module 412 can determine that the pattern includes a lever arm. In this case, the TDC module 412 can take into account the lever arm in determining which of the representations to use for the rotational variable θ. As another example, the TDC module 412 can determine that the pattern includes concentric circles, or a nut inside of another nut. In this case, the TDC module 412 can take into account the concentric circles or a nut inside of another nut in determining which of the representations to use for the rotational variable θ.

Once the TDC module 412 determines the representation for the rotational variable, the TDC module 412 can use the determine representation to represent each of the interest points. Subsequently, the TDC module 412 can be configured to determine the target distribution based on the representation of the interest points by finding a weighting function $f(x, y, \theta)$ that satisfies the following relationships:

$$f(x, y, \theta) = \arg\min_g \left[\sum_i (x_i - y_i) g(x_i, y_i, \theta_i)\right]^2 +$$

$$\left[\sum_i (x_i - \theta_i) g(x_i, y_i, \theta_i)\right]^2 + \left[\sum_i (y_i - , \theta_i) g(x_i, y_i, \theta_i)\right]^2$$

with the constraints that:

$$f(x_i, y_i, \theta_i) \geq 0, \forall i$$

$$\sum_i f(x_i, y_i, \theta_i) \neq 0$$

where i indexes the $i^{th}$ interest point.

Once the TDC module 412 determines the target distribution $f(x, y, \theta)$, the TDC module 412 can provide the target distribution $f(x, y, \theta)$ to the PDM module 416. Subsequently, the PDM module 416 can use the target distribution $f(x, y, \theta)$ as a probability distribution to sample probes on the pattern.

To facilitate the above optimization process, the probe placement module 408 can assume a functional form for the target distribution $f(x, y, \theta)$.

In some embodiments, the probe placement module 408 can assume that the target distribution $f(x, y, \theta)$ has a linear form. Although a linear function can become negative, the constraint $f(x_i, y_i, \theta_i) \geq 0$, $\forall i$ can force the target distribution to be positive at all interest points. When the target distribution $f(x, y, \theta)$ has a linear form, the optimization routine for finding the target distribution may be simple. However, because the space of linear functions is limited, it may be difficult to find a linear function that satisfies all the constraints.

In some embodiments, the probe placement module 408 can assume that the target distribution $f(x, y, \theta)$ has a non-linear form. When the target distribution $f(x, y, \theta)$ has a non-linear form, the optimization routine for finding the target distribution may be complex. However, because the space of non-linear functions is wide, it may be easier to find a non-linear function that satisfies all the constraints.

In some embodiments, the TDC module 412 can set the target distribution $f(x, y, \theta)$ as an inverse of an interest point distribution $p_p(x, y, \theta | \text{parameter})$. In this case, the TDC module 412 can receive, from the FDC module 414, the interest point distribution $p_p(x, y, \theta)$, and indirectly determine the target distribution $f(x, y, \theta)$ by computing an inverse:

$$f(x, y, \theta) = \frac{1}{p_p(x, y, \theta)}.$$

When the target distribution $f(x, y, \theta)$ defined as an inverse of an interest point distribution $p_p(x, y, \theta)$, the target distribution $f(x, y, \theta)$ will cause more probes to be sampled at locations with interest points that are relatively dissimilar compared to rest of the interest points.

The FDC module 414 can model the interest point distribution $p_p(x, y, \theta)$ as a mixture model. In some embodiments, the mixture model can include a Gaussian Mixture Model (GMM):

$$p_p\left(x_i, y_i, \theta_i \,\middle|\, \{\alpha_k, \bar{\mu}_k, \Sigma_k\}, k=1, \ldots, N\right) = \sum_{k=1\ldots N} \alpha_k N_{X,Y,\theta}(\bar{\mu}_k, \Sigma_k)$$

The GMM has four parameters: the number of Gaussian distributions N, the weight $\alpha_k$ of the $k^{th}$ Gaussian distribution, the mean vector $\bar{\mu}_k$ of the $k^{th}$ Gaussian distribution, and the covariance matrix $\Sigma_k$ of the $k^{th}$ Gaussian distribution. In other embodiments, the mixture model can include a mixtures of triangular distributions. The mixture of triangular distributions can be faster to calculate and can offer a similar desirable property of providing a soft grouping of interest points.

In some embodiments, the FDC module 414 can estimate the number of Gaussian distributions N for the GMM by clustering the interest points and determining the number of clusters that best fit the interest points. For example, the FDC module 414 can perform a k-means clustering operation on the interest points to estimate the number of Gaussian distributions N.

The remaining set of parameters $\{\alpha_k, \bar{\mu}_k, \Sigma_k\}$, k=1, ... N can be determined by maximizing the likelihood of parameters given the interest points. In some embodiments, the FDC module 414 can maximize the likelihood of the parameters given the interest points using an expectation-maximization technique. To perform expectation-maximization, the FDC module 414 can initialize the set of parameters $\{\alpha_k, \bar{\mu}_k, \Sigma_k\}$, k=1, ... N using the result from the clustering step.

As discussed above, the TDC module 412 can determine the target distribution $f(x, y, \theta)$ by simply inverting the interest point distribution $p_p(x, y, \theta)$. However, this target distribution $f(x, y, \theta)$ may cause most of the probes to be placed on edges with the least common perpendicular orientations. For example, when a pattern is capable of making only 2D translational movements and the pattern has a rectangular boundary with rounded corners, this target distribution $f(x, y)$ may cause the PDM module 416 to sample the mostly around the corner locations.

To address such issues, in some embodiments, the TDC module 412 can transform the interest point distribution $p_p(x, y, \theta)$ and invert the transformed interest point distribution $\widetilde{p_p}(x, y, \theta)$ to determine the target distribution $f(x, y, \theta)$. In "the first probe placement mechanism" described previously, this transformation takes the form of applying a smoothing kernel to $p_p(x, y, \theta)$.

In some cases, the TDC module 412 can determine the target distribution by transforming the interest point distribution in ways other than performing an inversion. One such embodiment transforms the interest point distribution $p_p(x_i, y_i, \theta_i | \{\alpha_k, \bar{\mu}_k, \Sigma\}, k=1, \ldots N)$ by finding new weights $\alpha_k$ that satisfy certain conditions. In estimating the set of parameters $\{\alpha_k, \bar{\mu}_k, \Sigma_k\}$, the TDC module 412 effectively performed a soft grouping of interest points (e.g., soft grouping into Gaussian distributions.) Now that the TDC module 412 has those groupings, the TDC module 412 can be configured to find the new weight $\widetilde{\alpha_k}$ to re-weight each group (e.g., each Gaussian distribution) individually.

For example, the TDC module 412 can denote $$\bar{\mu}_k = \begin{bmatrix} \mu_k^{(x)} \\ \mu_k^{(y)} \\ \mu_k^{(\Theta)} \end{bmatrix}.$$

In this representation, the TDC module 412 can be configured to find the weights $\widetilde{\alpha_k}$ that minimize the following relationship:

$$\left[\sum_{k=1\ldots,N} \widetilde{\alpha_k}(\mu_k^{(x)} - \mu_k^{(y)})\right]^2 + \left[\sum_{k=1\ldots,N} \widetilde{\alpha_k}(\mu_k^{(x)} - \mu_k^{(\Theta)})\right]^2 + \left[\sum_{k=1\ldots,N} \widetilde{\alpha_k}(\mu_k^{(y)} - \mu_k^{(\Theta)})\right]^2$$

with the constraint:

$$\sum_{k=1\ldots,N} \widetilde{\alpha_k} = 1$$

Using a Lagrange Multiplier, the TDC module 412 can reduce this problem as a set of linear equations:

$$2\widetilde{\alpha_k}[(\mu_k^{(x)} - \mu_k^{(y)})^2 + (\mu_k^{(x)} - \mu_k^{(\Theta)})^2 + (\mu_k^{(y)} - \mu_k^{(\Theta)})^2] + 2\sum_{l \neq k} \widetilde{\alpha_l}[(\mu_k^{(x)} - \mu_k^{(y)})(\mu_l^{(x)} - \mu_l^{(y)}) + (\mu_k^{(x)} - \mu_k^{(\Theta)})(\mu_l^{(x)} - \mu_l^{(\Theta)}) + (\mu_k^{(y)} - \mu_k^{(\Theta)})(\mu_l^{(y)} - \mu_l^{(\Theta)})] + \lambda = 0,$$

for k=1, ..., N and, $$\sum_{k=1\ldots,N} \widetilde{\alpha_k} - 1 = 0$$

The TDC module 412 could solve this set of linear equations with respect to $\widetilde{\alpha_k}$, but the TDC module 412 is subject to additional constraints. The above set of linear equations does not prevent the transformed weights $\widetilde{\alpha_k}$ from turning negative, or prevent a large weight $\widetilde{\alpha_k}$ from being assigned to Gaussians that were estimated from small groups of interest points (e.g., whose original weights $\alpha_k$ in the interest point distribution $p_p(x, y, \theta)$ was small). The TDC module 412 can programmatically apply these constraints.

Also, the TDC module 412 is configured to impose the minimum probe distance between adjacent probes by requiring the transformed weight $\widetilde{\alpha_k}$ to be greater than a predefined value:

$$\alpha_k \frac{N_{edges}}{N_{probes}} \times \frac{1}{d_{max}} \leq \widetilde{\alpha_k} \leq \alpha_k \frac{N_{edges}}{N_{probes}}$$

where $\alpha_k$ is the weight of the $k^{th}$ Gaussian distribution in the interest point distribution $p_p(x, y, \theta)$; $N_{edges}$ is the number of interest points used to estimate the weights $\alpha_k$ in the interest point distribution $p_p(x, y, \theta)$; $N_{probes}$ is the target number of probes (e.g., 64); and $d_{max}$ is the maximum allowable distance between probes in units of interest points or any predetermined units. The above equation can be re-arranged as follows:

$$d_{max} \geq \frac{\alpha_k N_{edges}}{\widetilde{\alpha_k} N_{probes}} \leq 1$$

This new relationship illustrates that the ratio of the number of edges to number of probes for mixture component k is bounded by $d_{max}$ units and 1 unit. Therefore, adjacent probes in cluster k can be placed no further apart than $d_{max}$ units and no closer than 1 unit.

When the set of linear equations produces a result with at least one weight $\alpha_k$ violating a constraint, the TDC module 412 can iterate over all possible combinations of boundary cases, calculate the optimal remaining weights, and select the constrained minimum.

For example, the TDC module 412 can determine all possible sets of boundary conditions (e.g., $\{\alpha_0^{low}\}$, $\{\alpha_0^{high}\}$, $\{\alpha_0^{low}, \alpha_1^{low}\}$, $\{\alpha_0^{high}, \alpha_1^{low}\}$, ...) for the linear equations. Each set of boundary conditions may include boundary conditions for a subset of transformed weights $\widetilde{\alpha_k}$. Subsequently, for each set of boundary conditions, the TDC module 412 can fix the value of a subset of weights $\widetilde{\alpha_k}$ to be the value of the corresponding boundary conditions, and solve the set of linear equations for the remaining free weights $\widetilde{\alpha_k}$ without boundary conditions. This way, the TDC module 412 can determine the global solution to the set of linear equations given the constraints by selecting, amongst the solutions under all possible sets of boundary conditions, the solution with the minimum score.

In some cases, when the number of Gaussian distributions in the GMM is greater than the number of dimensions in which the interest points lie, some of the parameters in the GMM may be linearly dependent. For example, mean vectors of Gaussian distributions may become linearly dependent when the number of Gaussian distributions is greater than the number of dimensions in which the interest points lie.

To address this issue, the TDC module 412 can be configured to regularize the parameters for the GMM, for example, using Tikhonov regularization. To this end, the TDC module 412 can reformulate the optimization problem to minimize the following relationship:

$$\left[\sum_{k=1\ldots,N} (\widetilde{\alpha_k} - \alpha_k)^2\right] + \lambda_0 \sum_{k=1\ldots,N} \widetilde{\alpha_k}(\mu_k^{(x)} - \mu_k^{(y)}) +$$
$$\lambda_1 \sum_{k=1\ldots,N} \widetilde{\alpha_k}(\mu_k^{(x)} - \mu_k^{(\Theta)}) + \phi\left[\left(\sum_{k=1\ldots,N} \widetilde{\alpha_k}\right) - 1\right]$$

The new Lagrangian formulation seeks to quantify the change in transformed weights $\widetilde{\alpha_k}$ between the interest point distribution $p_p(x, y, \theta)$ and the target distribution $\widetilde{p_p}(x, y, \theta)$, subject to the constraints that the $(x, y, \theta)$ components of the mean vectors are balanced and the sum of the transformed weights is 1.

The TDC module 412 could directly find the weights that satisfy the Lagrangian relationship stated above. However, as before, this relationship does not prevent the weights $\widetilde{\alpha_k}$ from turning negative, or prevent a large weight $\widetilde{\alpha_k}$ from being assigned to Gaussians that were estimated from small groups of interest points (e.g., whose original weights $\alpha_k$ in the interest point distribution $p_p(x, y, \theta)$ was small). The TDC module 412 can programmatically apply these constraints, as illustrated above. This is mathematically valid because the above Lagrangian relationship is quadratic in $\widetilde{\alpha_k}$, so if one of the weight $\widetilde{\alpha_k}$ is negative, then the optimal value should lie on one (or more) of the boundary conditions.

In summary, in order to identify parameters for the target distribution $\widetilde{p_p}(x, y, \theta)$ based on parameters of the interest point distribution $p_p(x, y, \theta)$, the TDC module 412 can use the following procedure:

1. Define $\delta_k^{(xy)} = \mu_k^{(x)} - \mu_k^{(y)}$, $\delta_k^{(x\theta)} = \mu_k^{(x)} - \mu_k^{(\Theta)}$ and $\mu_k^{(y)} - \mu_k^{(\Theta)}$.
2. If $N \leq N_{Dim}$, where $N_{Dim}$ is the dimension of the underlying data, use the following equation to solve for $\alpha_k$, $\{k=1 \ldots N\}$:

$$\begin{bmatrix} 2\left(\delta_1^{(xy)^2} + \delta_1^{(x\theta)^2} + \delta_1^{(y\theta)^2}\right) & \ldots & 2\left(\delta_1^{(xy)}\delta_k^{(xy)} + \delta_1^{(x\theta)}\delta_k^{(x\theta)} + \delta_1^{(y\theta)}\delta_k^{(y\theta)}\right) & \ldots & 2\left(\delta_1^{(xy)}\delta_N^{(xy)} + \delta_1^{(x\theta)}\delta_N^{(x\theta)} + \delta_1^{(y\theta)}\delta_N^{(y\theta)}\right) & 1 \\ \vdots & \vdots & \vdots & \vdots & \vdots & \vdots \\ 2\left(\delta_k^{(xy)}\delta_1^{(xy)} + \delta_k^{(x\theta)}\delta_1^{(x\theta)} + \delta_k^{(y\theta)}\delta_1^{(y\theta)}\right) & \ldots & 2\left(\delta_k^{(xy)^2} + \delta_k^{(x\theta)^2} + \delta_k^{(y\theta)^2}\right) & \ldots & 2\left(\delta_k^{(xy)}\delta_N^{(xy)} + \delta_k^{(x\theta)}\delta_N^{(x\theta)} + \delta_k^{(y\theta)}\delta_N^{(y\theta)}\right) & 1 \\ \vdots & \vdots & \vdots & \vdots & \vdots & \vdots \\ 2\left(\delta_N^{(xy)}\delta_1^{(xy)} + \delta_N^{(x\theta)}\delta_1^{(x\theta)} + \delta_N^{(y\theta)}\delta_1^{(y\theta)}\right) & \ldots & 2\left(\delta_N^{(xy)}\delta_k^{(xy)} + \delta_N^{(x\theta)}\delta_k^{(x\theta)} + \delta_N^{(y\theta)}\delta_k^{(y\theta)}\right) & \ldots & 2\left(\delta_N^{(xy)^2} + \delta_N^{(x\theta)^2} + \delta_N^{(y\theta)^2}\right) & 1 \\ 1 & \ldots & 1 & \ldots & 1 & 0 \end{bmatrix} \begin{bmatrix} \widetilde{\alpha_1} \\ \vdots \\ \widetilde{\alpha_k} \\ \vdots \\ \widetilde{\alpha_N} \\ \lambda \end{bmatrix} = \begin{bmatrix} 0 \\ 0 \\ 0 \\ 0 \\ 0 \\ 1 \end{bmatrix}$$

If this system is singular, the TDC module 412 can use regularization to solve this system. For example, if the TDC module 412 attempts to solve the matrix equation: $\overline{A}\overline{A}=\overline{b}$ but $\overline{A}$ is singular, then the TDC module 412 can instead solve $[\overline{A}^T\overline{A}-kI]\overline{A}=\overline{A}^T\overline{b}$. This way, the TDC module 412 can minimize the sum of $L_2$-norm of the solution vector, which, in turn, can prevent solutions with large positive and negative $\alpha_k$'s (summing to unity).

3. If $N>N_{Dim}$, use the following equation to solve for $\alpha_k$, $\{k=1 \ldots N\}$:

$$\begin{bmatrix} 2 & \cdots & 0 & \cdots & 0 & \delta_1^{(xy)} & \delta_1^{(x\theta)} & 1 \\ \vdots & \ddots & \vdots & \cdots & \vdots & \vdots & \vdots & \vdots \\ 0 & \cdots & 2 & \cdots & 0 & \delta_k^{(xy)} & \delta_k^{(x\theta)} & 1 \\ \vdots & \cdots & \vdots & \ddots & \vdots & \vdots & \vdots & \vdots \\ 0 & \cdots & 0 & \cdots & 2 & \delta_N^{(xy)} & \delta_N^{(x\theta)} & 1 \\ \delta_1^{(xy)} & \cdots & \delta_k^{(xy)} & \cdots & \delta_N^{(xy)} & 0 & 0 & 0 \\ \delta_1^{(x\theta)} & \cdots & \delta_k^{(x\theta)} & \cdots & \delta_N^{(x\theta)} & 0 & 0 & 0 \\ 1 & \cdots & 1 & \cdots & 1 & 0 & 0 & 0 \end{bmatrix} \begin{bmatrix} \widetilde{\alpha_1} \\ \vdots \\ \widetilde{\alpha_k} \\ \vdots \\ \widetilde{\alpha_N} \\ \lambda_0 \\ \lambda_1 \\ \phi \end{bmatrix} = \begin{bmatrix} 2\alpha_1 \\ \vdots \\ 2\alpha_k \\ \vdots \\ 2\alpha_N \\ 0 \\ 0 \\ 1 \end{bmatrix}$$

4. Check the solution of step 2 or step 3 against the constraints:

$$\alpha_k \frac{N_{edges}}{N_{probes}} \times \frac{1}{d_{max}} \leq \widetilde{\alpha_k} \leq \alpha_k \frac{N_{edges}}{N_{probes}}$$

5. If the solution falls outside the valid range of weights $\widetilde{\alpha_k}$, then for all possible sets of boundary conditions (e.g., constraints), use modified versions of steps 2 or 3 to find solution vectors for non-constrained $\widetilde{\alpha_k}$. Throughout the search, the TDC module 412 can keep track of the minimum values of, $$\left[\sum_{k=1\ldots,N} \widetilde{\alpha_k}(\mu_k^{(x)} - \mu_k^{(y)})\right]^2 +$$

$$\left[\sum_{k=1\ldots,N} \widetilde{\alpha_k}(\mu_k^{(x)} - \mu_k^{(\Theta)})\right]^2 + \left[\sum_{k=1\ldots,N} \widetilde{\alpha_k}(\mu_k^{(y)} - \mu_k^{(\Theta)})\right]^2$$

and $[\Sigma_{k=1,\ldots,N}(\widetilde{\alpha_k}-\alpha_k)]^2$. If the former relationship is greater than zero, then the TDC module 412 can use the former relationship to select the solution vector for $\widetilde{\alpha_k}$. If the former relationship is not greater than zero, the TDC module 412 can use the latter relationship to select the solution vector for $\widetilde{\alpha_k}$.

Sampling of Probes from Target Distribution

Once the TDC module 412 determines the transformed interest point distribution $\widetilde{p_p}(x, y, \theta)$, the TDC module 412 can provide the transformed interest point distribution $\widetilde{p_p}(x, y, \theta)$ (or an inverse of the transformed interest point distribution) to the PDM module 416. Subsequently, the PDM module 416 can sample from the inverse of the transformed interest point distribution $\widetilde{p_p}(x, y, \theta)$ to determine the location of probes one or more interest points in an image.

Intuitively speaking, the TDC module 412 is configured to choose the transformed interest point distribution $\widetilde{p_p}(x, y, \theta)$ such that the expected value of x, y and $\theta$ with respect to the transformed interest point distribution $\widetilde{p_p}(x, y, \theta)$ are as similar as possible:

$$\int_{s \in S_{probes}} x\widetilde{p_p}(x, y, \theta \mid \{\widetilde{\alpha_k}, \overline{\mu}_k, \Sigma_k\}, k=1 \ldots N) \cong$$

$$\int_{s \in S_{probes}} y\widetilde{p_p}(x, y, \theta \mid \{\widetilde{\alpha_k}, \overline{\mu}_k, \Sigma_k\}, k=1 \ldots N) \cong$$

$$\int_{s \in S_{probes}} \theta\widetilde{p_p}(x, y, \theta \mid \{\widetilde{\alpha_k}, \overline{\mu}_k, \Sigma_k\}, k=1 \ldots N)$$

Importance sampling allows the PDM module 416 to draw samples from a target distribution by weighting samples drawn from another different distribution with the condition that the samples have similar support. In other words:

$$\overline{x} \cong \sum_{s \in S_{probes}} x_s \widetilde{p_p}(x_s, y_s, \theta_s \mid \{\widetilde{\alpha_k}, \overline{\mu}_k, \Sigma_k\}, k=1 \ldots N) \cong$$

$$\sum_{s \in S_{i,p.}} x_s \frac{\widetilde{p_p}(x_s, y_s, \theta_s \mid \{\widetilde{\alpha_k}, \overline{\mu}_k, \Sigma_k\}, k=1 \ldots N)}{p_p(x_s, y_s, \theta_s \mid \{\widetilde{\alpha_k}, \overline{\mu}_k, \Sigma_k\}, k=1 \ldots N)}$$

$$p_p(x_s, y_s, \theta_s \mid \{\widetilde{\alpha_k}, \overline{\mu}_k, \Sigma_k\}, k=1 \ldots N)$$

where $S_{probes}$ is the set of probes and $S_{IP}$ is a set of interest points. Therefore, the PDM module 416 can use this relationship to weigh samples drawn from the interest point distribution $p_p(s \mid \{\alpha_k, \overline{\mu}_k, \Sigma_k\}, k=1 \ldots N)$ by:

$$\frac{\widetilde{p_p}(x, y, \theta \mid \{\widetilde{\alpha_k}, \overline{\mu}_k, \Sigma_k\}, k=1 \ldots N)}{p_p(x, y, \theta \mid \{\alpha_k, \overline{\mu}_k, \Sigma_k\}, k=1 \ldots N)}$$

Thus, when the PDM module 416 draws probes by placing probes at every interest point along a boundary of a pattern, then the PDM module 416 can weigh the probes by the above ratio $\dfrac{\widetilde{p_p}(x, y, \theta \mid \{\widetilde{\alpha_k}, \overline{\mu}_k, \Sigma_k\}, k=1 \ldots N)}{p_p(x, y, \theta \mid \{\alpha_k, \overline{\mu}_k, \Sigma_k\}, k=1 \ldots N)}$.

In some embodiments, the PDM module 416 can achieve similar effects by (1) spacing out adjacent probes by a distance that is the inverse of the above ratio along the pattern boundary and (2) compensating for the desired number of probes and the number of initial edges.

Therefore, in some embodiments, sampling from the inverse of the transformed interest point distribution $\widetilde{p_p}(x, y, \theta \mid \{\widetilde{\alpha_k}, \overline{\mu}_k, \Sigma_k\}, k=1 \ldots N)$ can be equivalent to requiring adjacent probes to be spaced out by the following amount:

$$\text{spacing} = \frac{p_p(x, y, \theta \mid \{\alpha_k, \overline{\mu}_k, \Sigma_k\}, k=1 \ldots N)}{\widetilde{p_p}(x, y, \theta \mid \{\widetilde{\alpha_k}, \overline{\mu}_k, \Sigma_k\}, k=1 \ldots N)} \times \frac{N_{edges}}{N_{probes}}$$

where $N_{edges}$ indicates a number of interest points used to determine parameters for the interest point distribution $p_p(x, y, \theta \mid \{\alpha_k, \overline{\mu}_k, \Sigma_k\}, k=1 \ldots N)$, and $N_{probes}$ indicates a target number of probes. This way, the density of probes along under-represented interest points can be increased.

To require the adjacent probes to be spaced out as such, the PDM module 416 can place probes on one or more interest points sequentially. For example, the PDM module 416 starts at an initial interest point (which may be arbitrarily selected) and place a first probe at the initial interest point. Then the PDM module 416 can use the relationship above to determine the distance between the first probe and a second probe to be placed adjacent to the first probe. Subsequently, the PDM module 416 can place the second probe at an interest point that is separated by the determined distance from the first probe. This process can be iterated until the PDM module 416 has considered all the plurality of interest points used in determining the interest point distribution $p_p(x, y, \theta | \{\alpha_k, \bar{\mu}_k, \Sigma_k\}, k=1 \ldots N)$.

Requiring adjacent probes to be spaced out by a certain amount can be interpreted as modifying (e.g., stretching) the arc length of adjacent interest points. As described previously, an interest point can be considered a representation of an initialized probe placed at the center of the interest point. Therefore, requiring adjacent probes to be spaced out by a certain amount can be interpreted as modifying the arc length between the centers of adjacent interest points. Thus, the first mechanism for placing probes (illustrated in regards to FIGS. 5-10) and the second mechanism for placing probes (illustrated in regards to FIGS. 11-12) have similar consequences.

While much of the discussion herein focused on a case in which the probability space spanned by the mixture model included a x-directional component, a y-directional component, and a rotational vector, the disclosed technique can be extended to increase the dimensionality of the probability space spanned by the mixture model. For example, the probe placement module 408 can be configured to balance information in a four-dimensional space:

$$\bar{\mu}_k = \begin{bmatrix} \mu_k^{(x)} \\ \mu_k^{(y)} \\ \mu_k^{(\Theta)} \\ \mu_k^{(\phi)} \end{bmatrix},$$

where $\varphi$ denotes scale. While the optimization step may be a bit more complicated, the probe placement module 408 can employ the same technique as in the three-dimensional space scenario. For example, the probe placement module 408 can be configured to minimize:

$$\left[\sum_{k=1\ldots N} \widetilde{\alpha_k}(\mu_k^{(x)} - \mu_k^{(y)})\right]^2 + \left[\sum_{k=1\ldots N} \widetilde{\alpha_k}(\mu_k^{(x)} - \mu_k^{(\Theta)})\right]^2 +$$

$$\left[\sum_{k=1\ldots N} \widetilde{\alpha_k}(\mu_k^{(x)} - \mu_k^{(\phi)})\right]^2 + \left[\sum_{k=1\ldots N} \widetilde{\alpha_k}(\mu_k^{(y)} - \mu_k^{(\Theta)})\right]^2 +$$

$$\left[\sum_{k=1\ldots N} \widetilde{\alpha_k}(\mu_k^{(y)} - \mu_k^{(\phi)})\right]^2 + \left[\sum_{k=1\ldots N} \widetilde{\alpha_k}(\mu_k^{(\Theta)} - \mu_k^{(\phi)})\right]^2$$

with the constraint:

$$\sum_{k=1\ldots N} \widetilde{\alpha_k} = 1$$

using a Lagrange multiplier to reduce to a set of linear equations (as before). The probe placement module 408 can be configured to ensure that the weights $\widetilde{\alpha_k}$ do not become negative or cause the probes to be highly concentrated on a few edge locations. To this end, as in the three-dimensional space scenario, the probe placement module 408 can be configured to apply boundary constraints programmatically.

As in the three-dimensional space scenario, the probe placement module 408 can apply Tikhonov regularization when the mean vector set is not linearly independent and when the number of components in the mixture model (N) exceeds the number of dimension (now 4):

$$\left[\sum_{k=1,N}(\widetilde{\alpha_k} - \alpha_k)^2\right] + \lambda_0 \sum_{k=1\ldots N} \widetilde{\alpha_k}(\mu_k^{(x)} - \mu_k^{(y)}) + \lambda_1 \sum_{k=1\ldots N} \widetilde{\alpha_k}(\mu_k^{(x)} - \mu_k^{(\Theta)}) +$$

$$\lambda_2 \sum_{k=1\ldots N} \widetilde{\alpha_k}(\mu_k^{(x)} - \mu_k^{(\phi)}) + \phi\left[\left(\sum_{k=1\ldots N} \widetilde{\alpha_k}\right) - 1\right]$$

Figure 13:
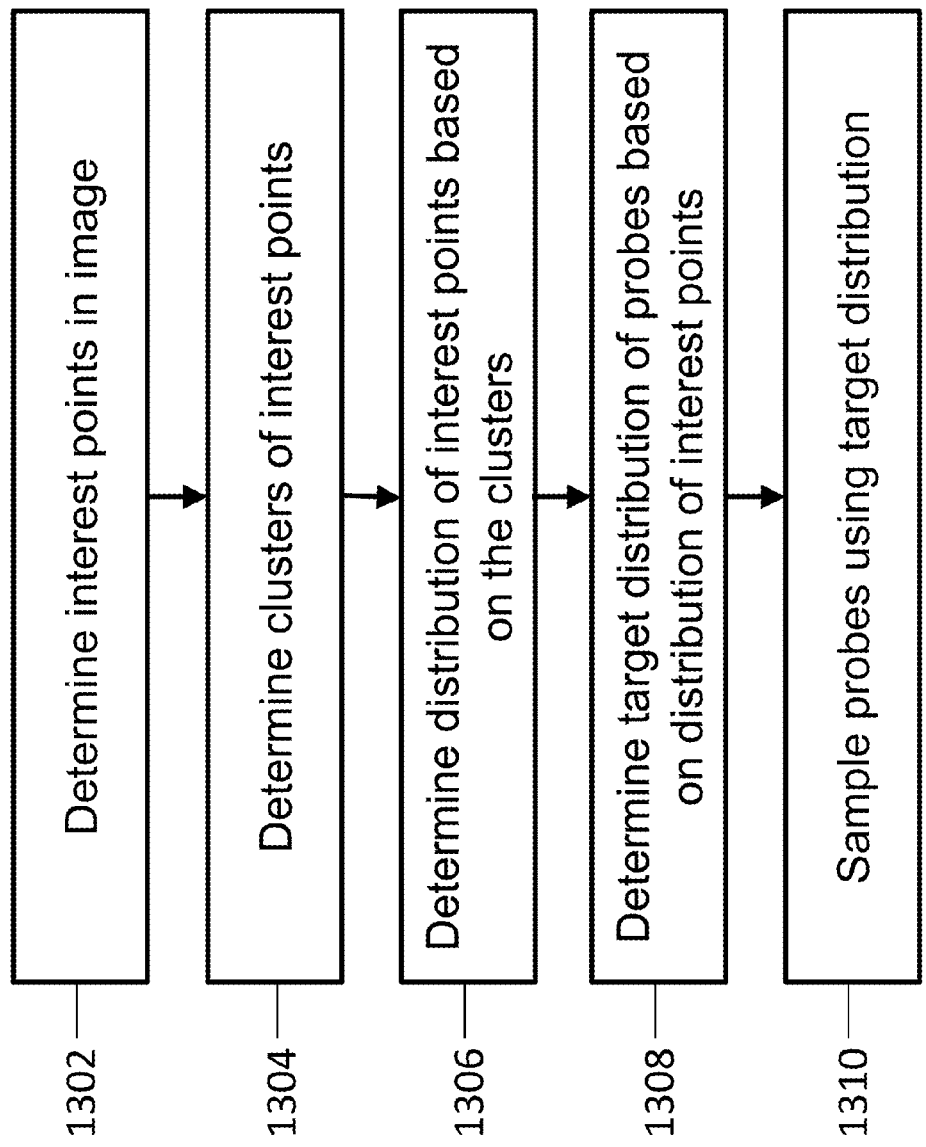
FIG. 13 summarizes a process of sampling probes in accordance with some embodiments.

FIG. 13 summarizes the process of sampling probes on one or more interest points of a pattern in accordance with some embodiments. In FIG. 13, the probe placement module 408 represents the target distribution as a parametric distribution. However, one of skill in the art can modify the process of FIG. 13 to accommodate a case in which the probe placement module 408 represents the target distribution as a non-parametric distribution.

In step 1302, the IPD module 406 can determine interest points in an image. In some cases, the IPD module 406 can use an edge detection technique to identify the interest points. The edge detection technique can include, for example, a canny edge detection technique or a Hough transform technique. The edge detection technique can use one or more edge detection operators, including, for example, a Sobel operator, a Kirsch operator, a Prewitt operator, a Gabor filter, a Haar wavelet filter, any other filters that can detect a change in a pixel value in an image (e.g., a high frequency component of an image), and/or any combinations thereof.

In some embodiments, the IPD module 406 can provide the location information of interest points to the FDC module 414. The FDC module 414 can represent each interest point using variables that represent the degrees of freedom associated with the interest point. For example, when an interest point is known to move in two dimensions, an interest point can be represented as a two dimensional vector corresponding to (x, y) gradient components of the interest point. As another example, when an interest point is known to move in three dimensions, an interest point can be represented as a three dimensional vector corresponding to (x, y) gradient components of the interest point and a rotational orientation of the interest point (or a function thereof).

In step 1304, the FDC module 414 can be configured to cluster the interest points. For example, the FDC module 414 can cluster the interest points by clustering interest points that are close to one another in the Euclidian distance in their representations. In some embodiments, the FDC module 414 can use k-means clustering technique, a mean-shift clustering technique, a "balanced iterative reducing and clustering using hierarchies" (BIRCH) clustering technique, or any other suitable clustering techniques that are capable of grouping interest points with similar characteristics.

In step 1306, the FDC module 414 can determine the interest point distribution based on the clusters from step 1304. For example, the FDC module 414 can be configured to represent the interest point distribution using a Gaussian Mixture Model. In this case, the FDC module 414 can be configured to determine the number of Gaussian distributions for the Gaussian Mixture Model using the number of clusters from the cluster step. Also, the FDC module 414 can be configured to perform an expectation-maximization operation to determine the maximum likelihood estimates of the set of parameters for the Gaussian Mixture Model. This way, the FDC module 414 can determine the interest point distribution $p_p(x, y, \theta | \{\alpha_k, \bar{\mu}_k, \Sigma_k\}, k=1 \ldots N)$. The FDC module 414 can provide the interest point distribution $p_p(x, y, \theta | \{\alpha_k, \bar{\mu}_k, \Sigma_k\}, k=1 \ldots N)$ to the TDC module 412.

In step 1308, the TDC module 412 can determine the transformed interest point distribution $\tilde{p}_p(x, y, \theta | \{\widetilde{\alpha}_k, \bar{\mu}_k, \Sigma_k\}, k=1 \ldots N)$ from the interest point distribution $p_p(x, y, \theta | \{\alpha_k, \bar{\mu}_k, \Sigma_k\}, k=1 \ldots N)$. To this end, the TDC module 412 can perform constrained optimization, as discussed above, to re-calculate the transformed weights $\widetilde{\alpha}_k$ for the transformed interest point distribution. In some cases, the TDC module 412 can compute the target probe distribution by inverting the transformed interest point distribution $\tilde{p}_p(x, y, \theta | \{\widetilde{\alpha}_k, \bar{\mu}_k, \Sigma_k\}, k=1 \ldots N)$. Subsequently, the TDC module 412 can provide the transformed interest point distribution (or the inverse of the transformed interest point distribution) to the PDM module 416.

In step 1310, the PDM module 416 is configured to sample the target distribution (e.g., the inverse of the transformed interest point distribution) to determine the location of probes on one or more interest points. In some cases, the PDM module 416 can use the following relationship to determine the spacing between two adjacent probes:

$$\text{spacing} = \frac{p_p(x, y, \theta | \{\alpha_k, \bar{\mu}_k, \Sigma_k\}, k = 1 \ldots N)}{\tilde{p}_p(x, y, \theta | \{\widetilde{\alpha}_k, \bar{\mu}_k, \Sigma_k\}, k = 1 \ldots N)} \times \frac{N_{edges}}{N_{probes}}$$

The PDM module 416 can use the above relationship to determine or modify the distance between centers of all adjacent interest points (or between centers of a subset of adjacent interest points).

Figure 14B:
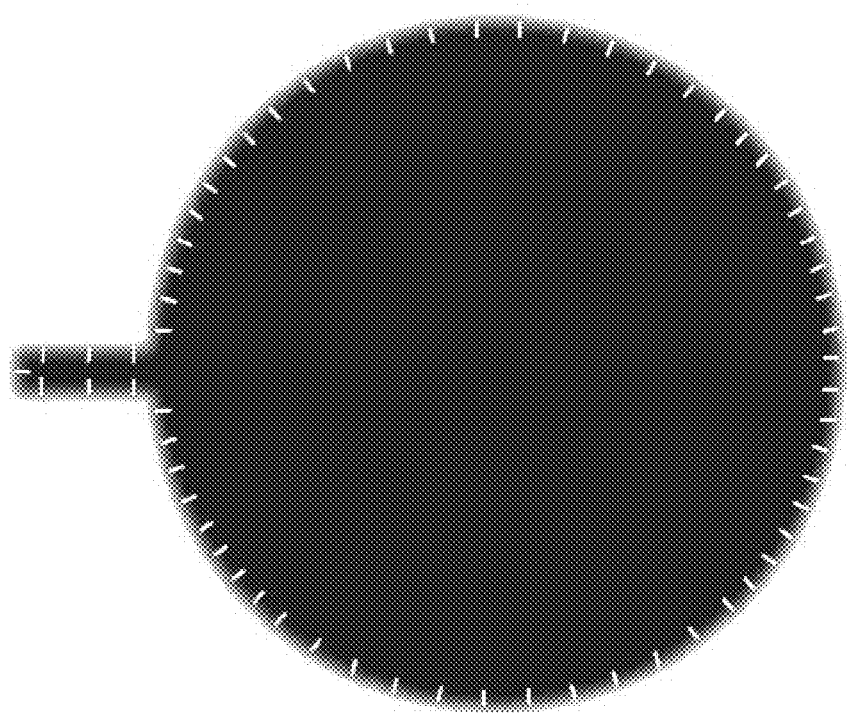
FIG. 14B illustrates placement of probes on a circular object having a lever arm using the process illustrated in FIG. 13 in accordance with some embodiments.
Figure 14A:
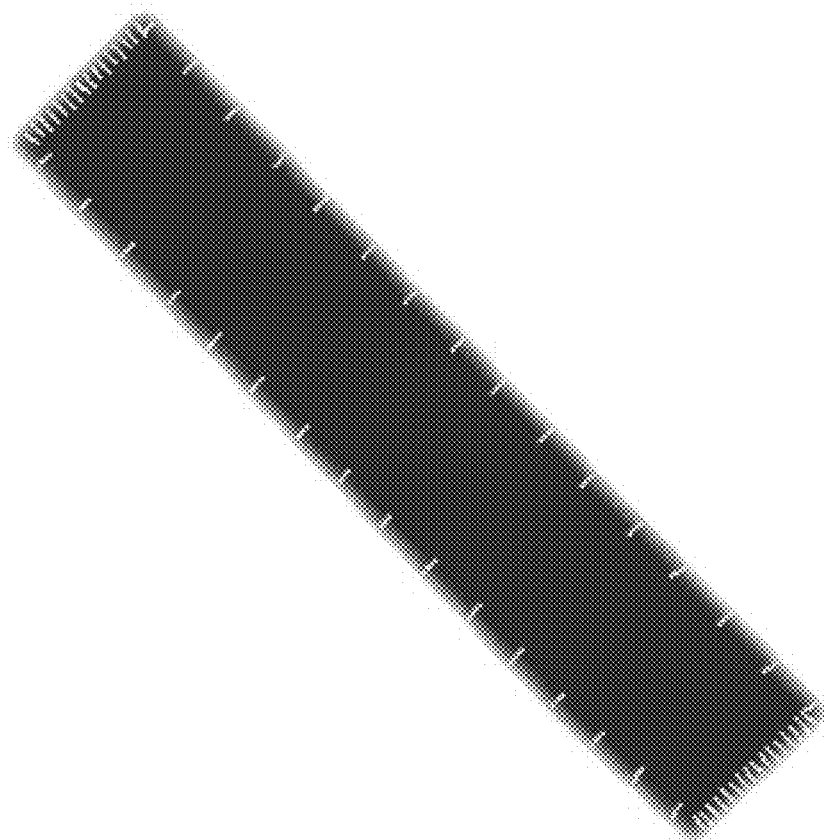
FIG. 14A illustrates placement of probes on a rectangle using the process illustrated in FIG. 13 in accordance with some embodiments.

FIG. 14A illustrates placement of probes on a rectangle using the process illustrated in FIG. 13 in accordance with some embodiments. The rectangle is assumed to have two degrees of freedom (e.g., the rectangle is assumed to make only translational movements). In this case, the PDM module 416 increased the density of probes along the short edge of the rectangle compared to the long edge of the rectangle. This outcome is similar to the result of balancing the histogram of perpendicular orientations, as discussed in regards to FIGS. 5-10.

FIG. 14B illustrates placement of probes on a circular object having a lever arm using the process illustrated in FIG. 13 in accordance with some embodiments. The pattern is assumed to have two degrees of freedom (e.g., the pattern is assumed to make only translational movements.) In this case, the PDM module 416 compensates for the extra x-directional probes on the lever arm by increasing slightly more y-directional probes on the circle.

Figure 15B:
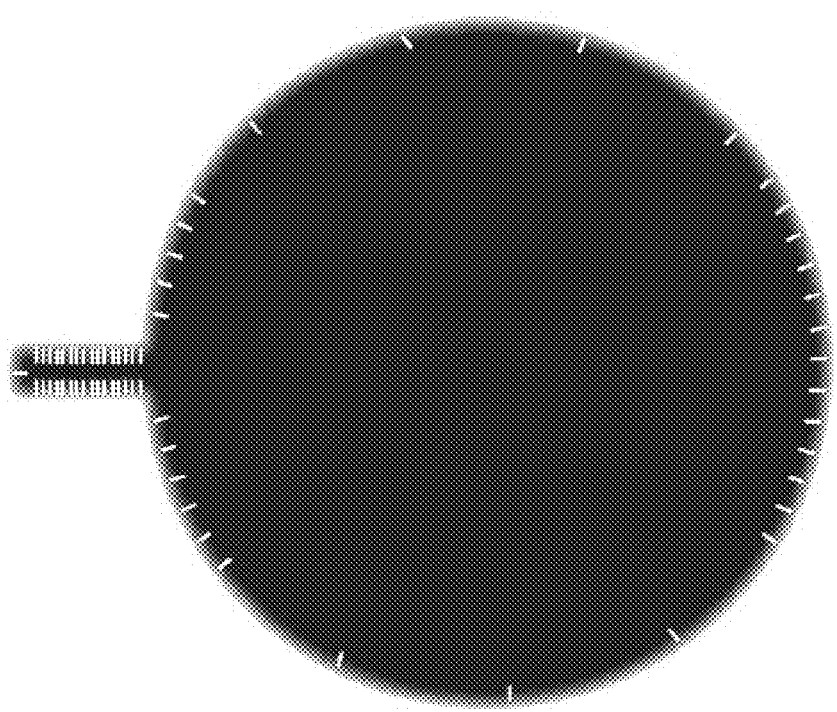
FIG. 15B illustrates placement of probes on a circular object having a lever arm using the process illustrated in FIG. 13 in accordance with some embodiments.
Figure 15A:
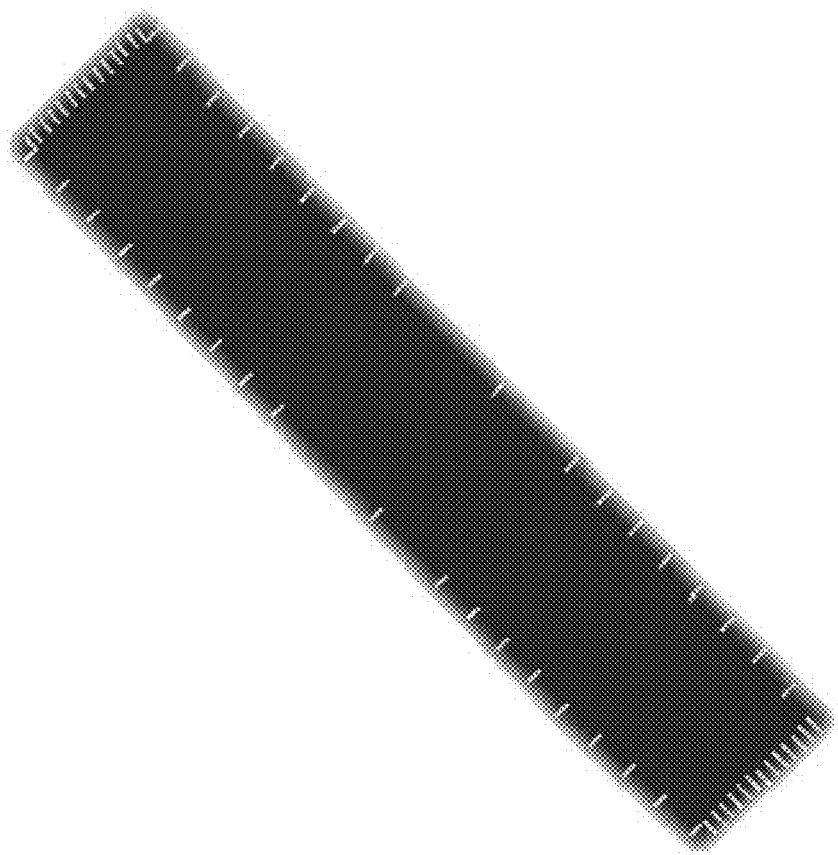
FIG. 15A illustrates placement of probes on a rectangle using the process illustrated in FIG. 13 in accordance with some embodiments.

FIG. 15A illustrates placement of probes on a rectangle using the process illustrated in FIG. 13 in accordance with some embodiments. The rectangle is assumed to have three degrees of freedom (e.g., the rectangle is assumed to make translational movements and a rotational movement.) and the rotational vector is given by $$\theta_i = \frac{\|v_i\| \times \bar{u}_i^{(\theta)} \cdot \bar{d}_i}{\frac{1}{N}\sum_{i=0}^{N}\|v_i\|}.$$

In this case, the PDM module 416 increased the density of probes along the short edge of the rectangle compared to the long edge of the rectangle, as in FIG. 14A. However, the PDM module 416 also modified the distance of probes along the long edge, increasing the number of probes further away from the origin of the rectangle (e.g., the center of mass of the rectangle). This is because the rotational variable $\theta$ was dependent on the distance between the origin of the rectangle and the probe.

FIG. 15B illustrates placement of probes on a circular object having a lever arm using the process illustrated in FIG. 13 in accordance with some embodiments. The pattern is assumed to have three degrees of freedom (e.g., the pattern is assumed to make translational movements and a rotational movement). In this case, the PDM module 416 increased the density of probes along the lever because the rotational variable $\theta$ was dependent on the distance between the origin of the rectangle and the probe. However, the PDM module 416 decreased the number of probes placed around the circular boundary. In particular, the PDM module 416 decreased the number of probes along the boundary close to the horizontal axis. In this case, the lever arm edges include all the rotational degree of freedom alignment information and thus are given many more probes. These probes are also useful for aligning in the x-direction but completely lack y-directional information. Therefore, the PDM module 416 adds more probes to the top and bottom than the left and right sides of the circle to introduce y-directional information to the model.

Figures 16A, 16B:
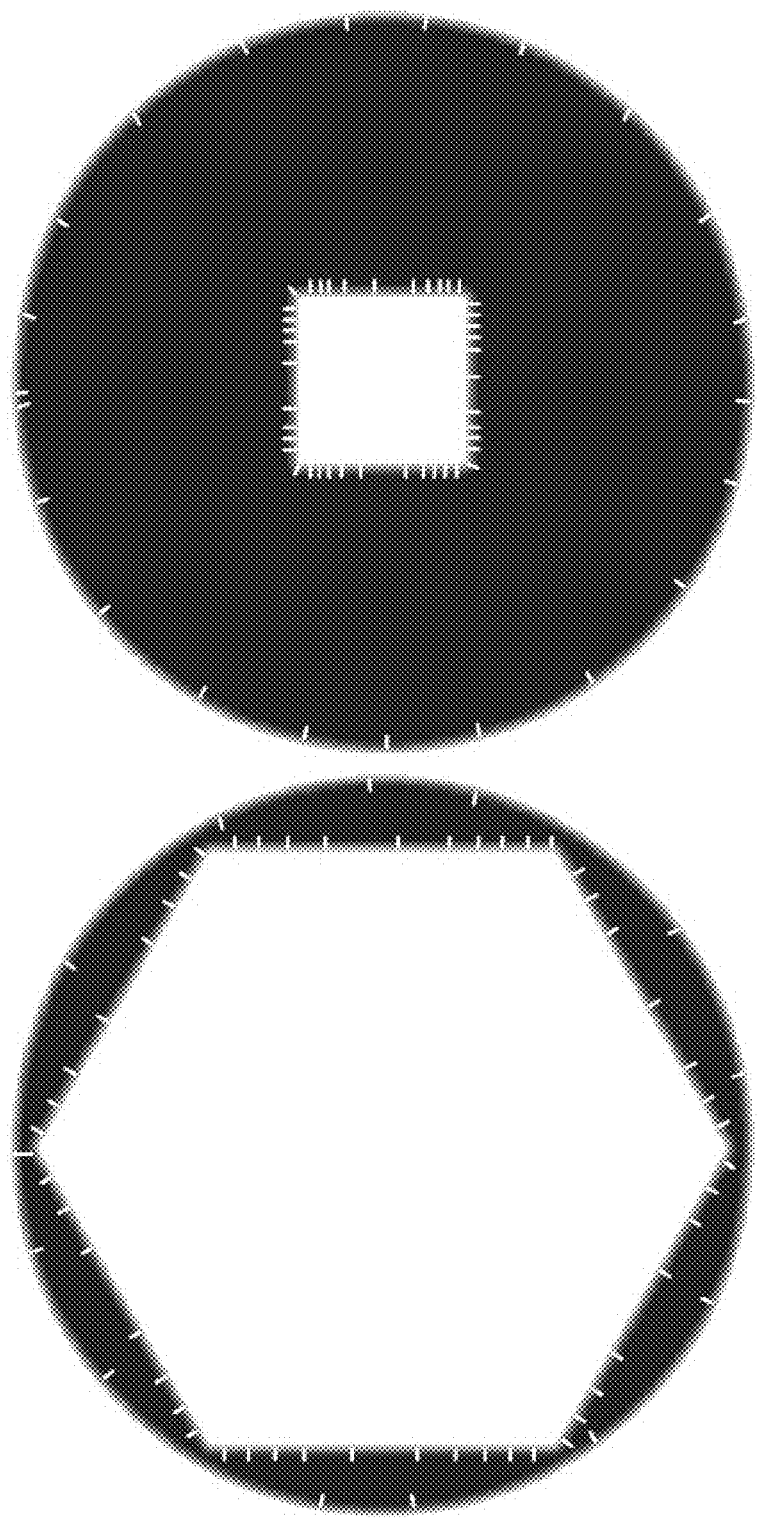
FIGS. 16A-16B illustrate placement of probes on patterns with a hole using the process illustrated in FIG. 13 in accordance with some embodiments.

FIGS. 16A-16B illustrate placement of probes on patterns with a hole using the process illustrated in FIG. 13 in accordance with some embodiments. When a boundary is wholly inside another boundary (e.g., concentric circles or a nut inside another nut), the probe placement module 408 can control whether one of the boundaries should be given more preference for placing probes, and if so, which one of the boundaries should be given more preference. In some embodiments, the probe placement module 408 can encode such a preference in the rotational variable $\theta$.

FIGS. 17A-17C illustrate how the representation of the rotational variable $\theta$ changes the probe placement in accordance with some embodiments. FIG. 17A corresponds to probe placement when the rotational variable $\theta$ is independent of the norm of the positional vector $$\|v_i\|: \theta_i = \frac{\|v_i \cdot u_{\theta_i}\|}{\|v_i\|};$$

FIG. 17B corresponds to probe placement when the rotational variable $\theta$ is dependent on the norm of the positional vector $\|v_i\|$ as follows:

$$\theta_i = \frac{\|v_i\| \times \bar{u}_i^{(\theta)} \cdot \bar{d}_i}{\frac{1}{N}\sum_{i=0}^{N}\|v_i\|},$$

which incorporates radius in a linear fashion to model a quantity that could be thought of as angular momentum; and FIG. 17C corresponds to probe placement when the rotational variable θ is dependent on the norm of the positional vector $\|v_i\|$ as follows:

$$\theta_i = \frac{\|v_i\| \times \overline{u}_i^{(\theta)} \cdot \overline{d}_i}{\frac{1}{N}\sum_{i=0}^{N} \|v_i\|^2},$$

which uses the square to form a quantity akin to angular moment of inertia. Depending on the application, one of these formulations can be more preferable. The increase in order of the radius term tends to push the probes whose angular component is highest to the outermost regions of the pattern. This has implications when picking a spacing over which to apply the probes when searching for the pattern in an image. It also has implications to the angular alignment accuracy.

Figures 18A, 18B:
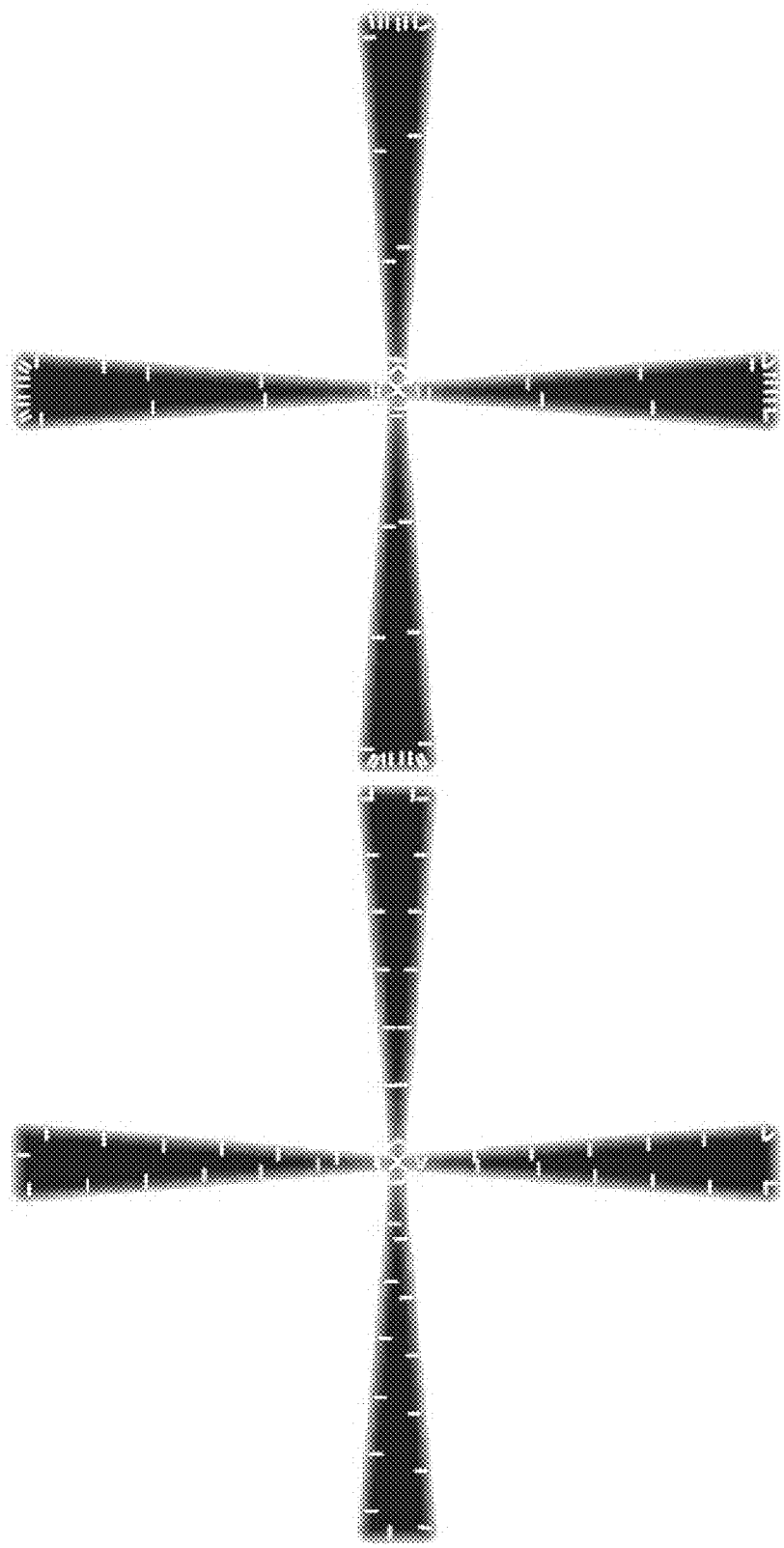
FIGS. 18A-18B illustrate placement of probes on patterns with elongated arms using the process illustrated in FIG. 13 in accordance with some embodiments.

FIGS. 18A-18B illustrate placement of probes on patterns with elongated arms using the process illustrated in FIG. 13 in accordance with some embodiments. In FIG. 18A, the probe placement module 408 assumes that the pattern has three degrees of freedom (e.g., the pattern is assumed to make translational movements and a rotational movement); in FIG. 18B, the probe placement module 408 assumes that the pattern has four degrees of freedom (e.g., the pattern is assumed to make translational movements, a rotational movement, and a movement towards/away from the imaging device).

These figures illustrate an interesting case because the four Gaussian distributions in the interest point distribution have dependent mean vectors:

$$\mu_0 \cong \begin{bmatrix} 1 \\ 0 \\ 0 \\ 1 \end{bmatrix}, \mu_1 \cong \begin{bmatrix} 0 \\ 1 \\ 0 \\ 1 \end{bmatrix}, \mu_2 \cong \begin{bmatrix} 0 \\ 1 \\ 1 \\ 0 \end{bmatrix}, \mu_3 \cong \begin{bmatrix} 1 \\ 0 \\ 1 \\ 0 \end{bmatrix}.$$

In this case, the unregularized optimization can provide a solution in which the weights may have large values (e.g., $\alpha_0 \cong +$large, $\alpha_1 \approx -$large, $\alpha_2 \cong +$large $\alpha_3 \approx -$large,) but can add up to one. To address such singularities, the TDC module 412 can regularize the optimization problem.

The probe placement module 408 can be used in a variety of applications. For example, the probe placement module 408 can be useful in aligning and inspecting patterns, such as electronic devices. Also, the probe placement module 408 can be useful in robot guidance. For example, when a robot is configured to pick up a long, skinny battery, the probe placement module 408 can be configured to place probes to improve the accuracy of the model representing the skinny battery.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and apparatus for carrying out the several purposes of the disclosed subject matter. It is important, therefore, that the claims be regarded as including such equivalent constructions insofar as they do not depart from the spirit and scope of the disclosed subject matter. For example, some of the disclosed embodiments relate one or more variables. This relationship may be expressed using a mathematical equation. However, one of ordinary skill in the art may also express the same relationship between the one or more variables using a different mathematical equation by transforming the disclosed mathematical equation. It is important that the claims be regarded as including such equivalent relationships between the one or more variables.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A machine vision system comprising:
a processor configured to run a computer program stored in memory that is configured to:
determine, using an interest point detection module, a plurality of interest points from an image;
determine, by a feature distribution computation (FDC) module stored in the memory in communication with the interest point detection module, an interest point distribution of the plurality of interest points, comprising data indicative of a distribution of the interest points in the image;
determine, using a target distribution computation (TDC) module, a target distribution of a plurality of probes, wherein:
each probe from the plurality of probes is used to model a portion of a pattern; and
the target distribution is indicative of a desired placement of the probes on one or more of the interest points; and
determine, by a probe distribution match (PDM) module in communication with the TDC module and the FDC module, placements of the plurality of probes on one or more of the interest points based at least in part on the interest point distribution to match a distribution of the plurality of probes to the target distribution to generate a model for the pattern, the model comprising the plurality of probes and associated placements.

2. The machine vision system of claim 1, wherein the processor is further configured to:
determine orientations at the plurality of interest points, and
determine a histogram of orientations indicative of a number of interest points having a particular orientation.

3. The machine vision system of claim 2, wherein the processor is further configured to smooth the histogram of the orientations using a smoothing function.

4. The machine vision system of claim 3, wherein the smoothing function comprises a circular kernel in an orientation domain.

5. The machine vision system of claim 4, wherein the circular kernel comprises a cosine function.

6. The machine vision system of claim 1, wherein the processor is further configured to find the plurality of probes that are equally balanced in all dimensions, such that each number of probes from the plurality of probes that are associated with different orientations are balanced.

7. The machine vision system of claim 1, wherein the interest points are associated with a boundary of a pattern modeled by the plurality of probes, wherein the interest points are associated with an arc along the boundary, and wherein the processor is further configured to:
   place a first probe at a first interest point;
   adjust a length of an arc of the first interest point based on the number of interest points having a substantially similar orientation as the first interest point and a second number of interest points having a different orientation than the first interest point; and
   place a second probe at a second interest point based on the adjusted length of the arc of the first interest point.

8. The machine vision system of claim 1, wherein the processor is further configured to fit the distribution of the orientations of the plurality of interest points to a mixture of probability distributions comprising a mixture model.

9. The machine vision system of claim 8, wherein the processor is further configured to determine a number of components of the mixture model of the interest point distribution by clustering the plurality of interest points into at least one cluster.

10. The machine vision system of claim 8, wherein the processor is further configured to adjust the weights of the interest point distribution mixture model to determine the target distribution having a property that at least one of its moments is approximately equal across each of the considered dimensions.

11. The machine vision system of claim 1, wherein the processor is further configured to use the target distribution to interest point orientation distribution ratio to re-sample the interest points and produce the plurality of probes.

12. The machine vision system of claim 1, wherein the interest point distribution and the target distribution comprise distributions over a predetermined set of dimensions, wherein the predetermined set of dimensions comprises one of Euclidean dimensions or cylindrical dimensions.

13. A method comprising:
   determining, by an interest point detection module in a machine vision system, a plurality of interest points from an image;
   determining, by a feature distribution computation (FDC) module coupled to the interest point detection module in the machine vision system, an interest point distribution of the plurality of interest points, comprising data indicative of a distribution of the interest points in the image;
   determining, using a target distribution computation (TDC) module, a target distribution of a plurality of probes, wherein:
      each probe from the plurality of probes is used to model a portion of a pattern; and
      the target distribution is indicative of a desired placement of the probes on one or more of the interest points; and
   determining, by a probe distribution match (PDM) module coupled to the TDC module and the FDC module, placements of the plurality of probes on one or more of the interest points based at least in part on the interest point distribution to match a distribution of the plurality of probes to the target distribution to generate a model for the pattern, the model comprising the plurality of probes and associated placements.

14. The method of claim 13, wherein determining the interest point distribution comprises:
   determining orientations at the plurality of interest points, and
   determining a histogram of the orientations indicative of a number of interest points having a particular orientation.

15. The method of claim 14, further comprising smoothing the histogram of the orientations using a smoothing function.

16. The method of claim 13, further comprising identifying the plurality of probes that are equally balanced in all considered dimensions, such that each number of probes from the plurality of probes that are associated with different orientations are balanced.

17. The method of claim 13, wherein the interest points are associated with a boundary of a pattern modeled by the plurality of probes, wherein the interest points are associated with an arc along the boundary, and wherein determining the placements of the plurality of probes based at least in part on the interest point distribution comprises:
   placing a first probe at a first interest point;
   adjusting a length of an arc of the first interest point based on the number of interest points having a substantially similar orientation as the first interest point and a second number of interest points having a different orientation than the first interest point; and
   placing a second probe at a second interest point based on the adjusted length of the arc of the first interest point.

18. The method of claim 13, wherein determining the interest point distribution comprises fitting the plurality of interest points to a probability distribution comprising a mixture model, wherein the probability distribution is indicative of at least a distribution of orientations measured at the plurality of interest points.

19. The method of claim 13, further comprising determining a number of components of the mixture model of the interest point distribution by clustering the plurality of interest points into at least one cluster.

20. A non-transitory computer readable medium having executable instructions associated with an interest point detection module, a feature distribution computation (FDC), a target distribution computation (TDC) module, and a probe distribution match (PDM) module, operable to cause a machine vision system to:
   determine a plurality of interest points from an image;
   determine an interest point distribution of the plurality of interest points, comprising data indicative of a distribution of the interest points in the image;
   determine a target distribution of a plurality of probes, wherein:
      each probe from the plurality of probes is used to model a portion of a pattern; and
      the target distribution is indicative of a desired placement of the probes on one or more of the interest points; and
   determine placements of the plurality of probes on one or more of the interest points based at least in part on the interest point distribution to match a distribution of the plurality of probes to the target distribution to generate a model for the pattern, the model comprising the plurality of probes and associated placements.

* * * * *